(12) United States Patent
Edmonds et al.

(10) Patent No.: US 8,998,091 B2
(45) Date of Patent: *Apr. 7, 2015

(54) HYBRID-TYPE BIOPTICAL LASER SCANNING AND DIGITAL IMAGING SYSTEM SUPPORTING AUTOMATIC OBJECT MOTION DETECTION AT THE EDGES OF A 3D SCANNING VOLUME

(71) Applicant: Metrologic Instruments, Inc., Blackwood, NJ (US)

(72) Inventors: Shane Michael Edmonds, Monroeville, NJ (US); Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,515

(22) Filed: Oct. 10, 2013

(65) Prior Publication Data

US 2014/0027518 A1 Jan. 30, 2014

Related U.S. Application Data

(63) Continuation-in-part of application No. 13/160,873, filed on Jun. 15, 2011, now Pat. No. 8,561,905, and a continuation-in-part of application No. 13/246,936, filed on Sep. 28, 2011, now Pat. No. 8,794,525.

(51) Int. Cl.
*G06K 7/10* (2006.01)
(52) U.S. Cl.
CPC ........ *G06K 7/10821* (2013.01); *G06K 7/10554* (2013.01); *G06K 7/10722* (2013.01); *G06K 7/10792* (2013.01); *G06K 7/1096* (2013.01)

(58) Field of Classification Search
USPC ..................... 235/435, 454, 462.01
See application file for complete search history.

(56) References Cited

U.S. PATENT DOCUMENTS 5,059,777 A 10/1991 Wittensoldner et al.
7,137,555 B2 * 11/2006 Bremer et al. ........... 235/462.07
(Continued)

FOREIGN PATENT DOCUMENTS

EP 1 400 915 A2 3/2004

OTHER PUBLICATIONS

European Search Report of counterpart Application No. EP 12 17 0336; dated Aug. 7, 2013, 3 pgs.
(Continued)

*Primary Examiner* — Christle I Marshall
(74) *Attorney, Agent, or Firm* — Addition, Higgins & Pendleton, P.A.

(57) ABSTRACT

A hybrid-type bi-optical bar code symbol reading system has a vertical housing section with a vertical scanning window and a horizontal housing section with a horizontal scanning window from which laser scanning planes are projected and intersect within a 3D scanning volume defined between the vertical and horizontal scanning windows. An automatic object edge-motion detection subsystem is provided for detecting the entry and exit of objects at the edge of the 3D scanning volume and generating control signals in response thereto. A digital imaging subsystem is supported within the system housing and automatically projects a field of view (FOV) within the 3D scanning volume in response to control signals generated by the automatic object edge-motion detection subsystem and timer settings managed by a system controller.

20 Claims, 24 Drawing Sheets

(56) References Cited

U.S. PATENT DOCUMENTS

| | | | |
|---|---|---|---|
| 8,561,905 B2 * | 10/2013 | Edmonds et al. | 235/462.14 |
| 2011/0073652 A1 | 3/2011 | Vinogradov et al. | |
| 2011/0132985 A1 * | 6/2011 | McQueen et al. | 235/454 |
| 2013/0075168 A1 * | 3/2013 | Amundsen et al. | 177/1 |

OTHER PUBLICATIONS

EP Office Action, dated Oct. 10, 2014, Application No. 12 170 336.7-1806.

* cited by examiner

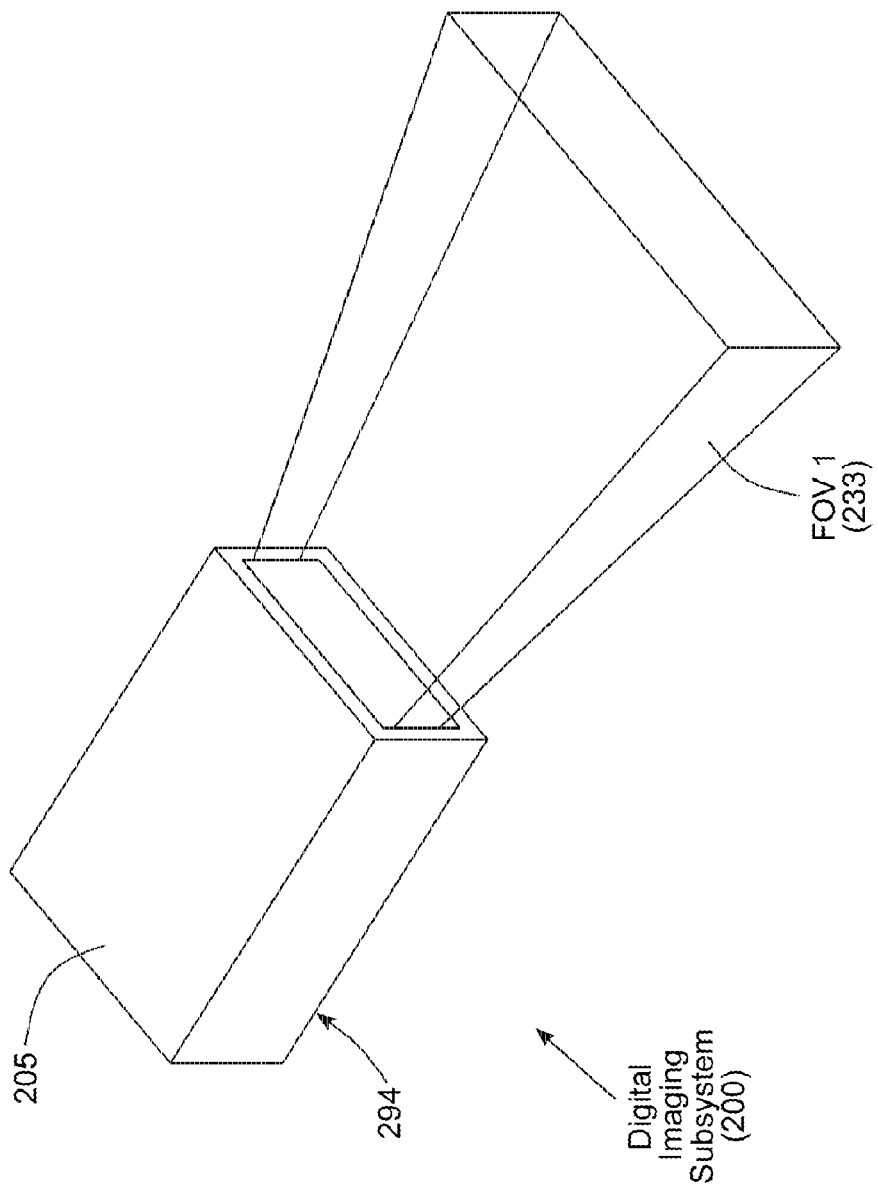

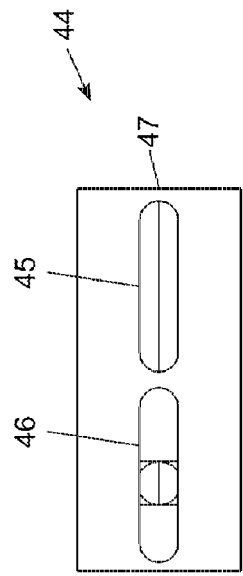
FIG. 4A3
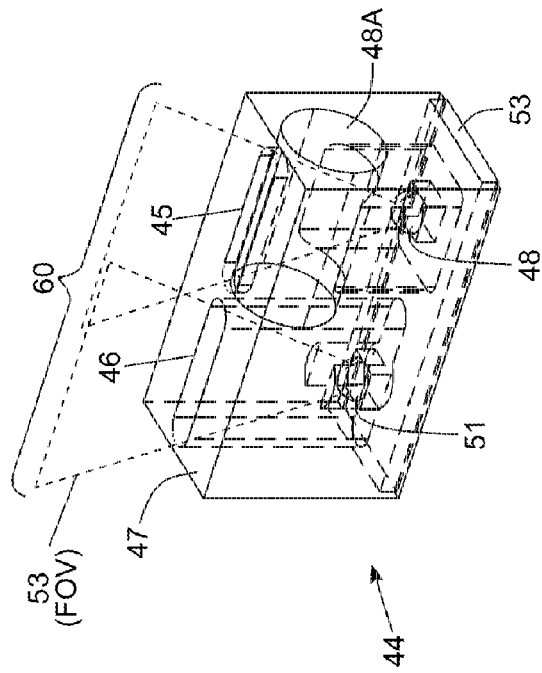
FIG. 4A4
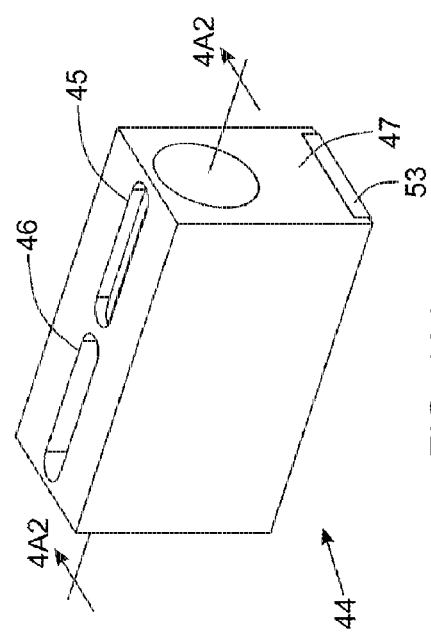
FIG. 4A1
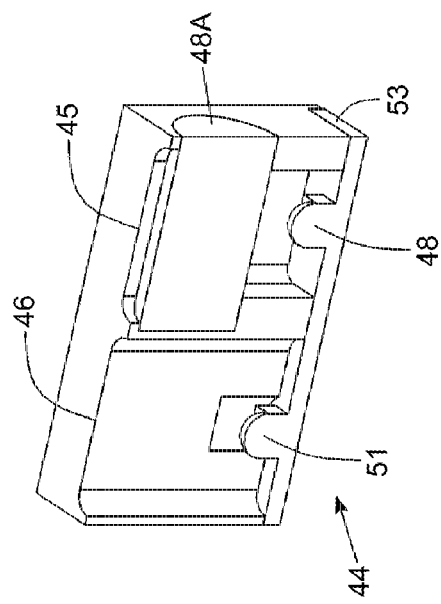
FIG. 4A2

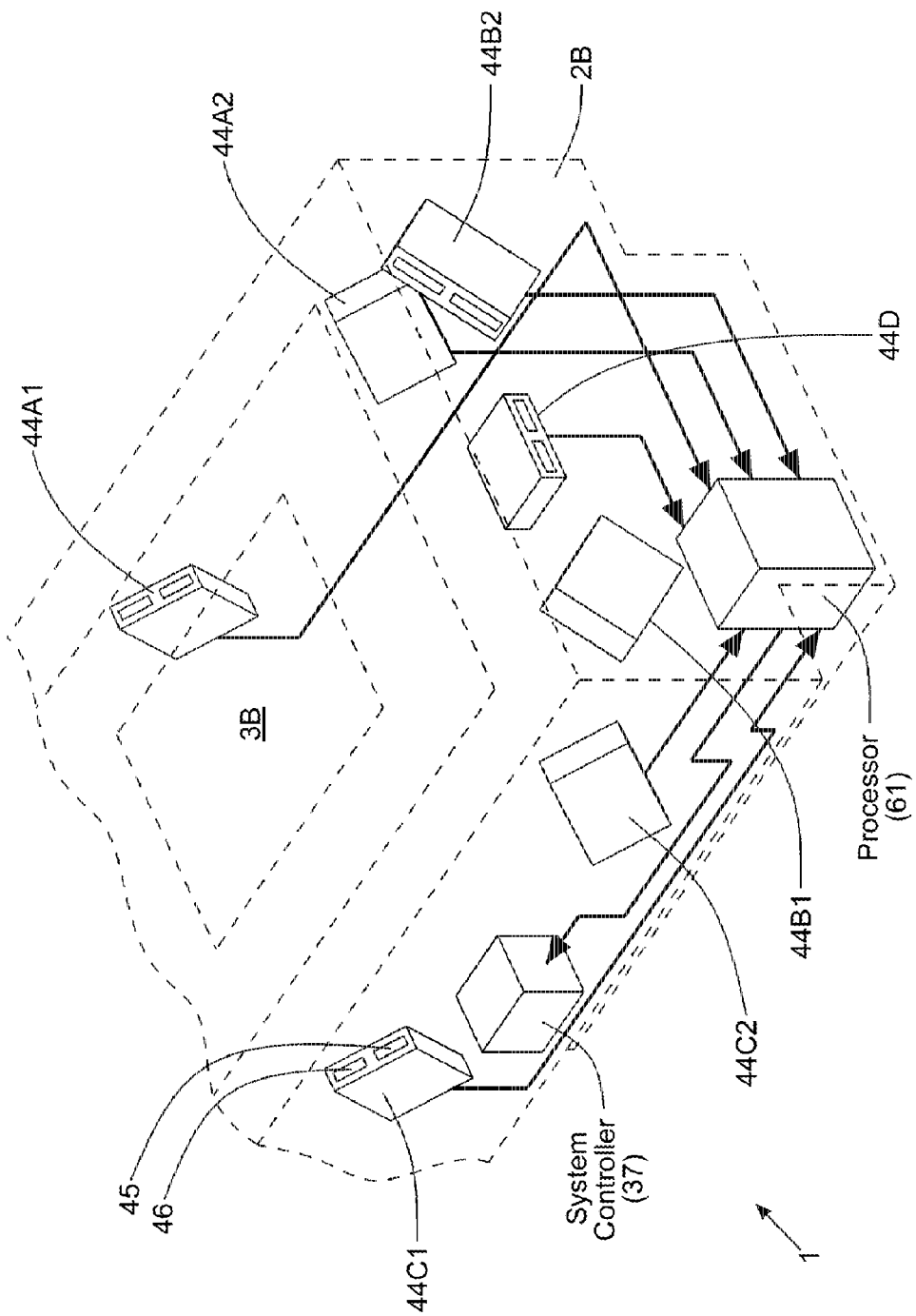

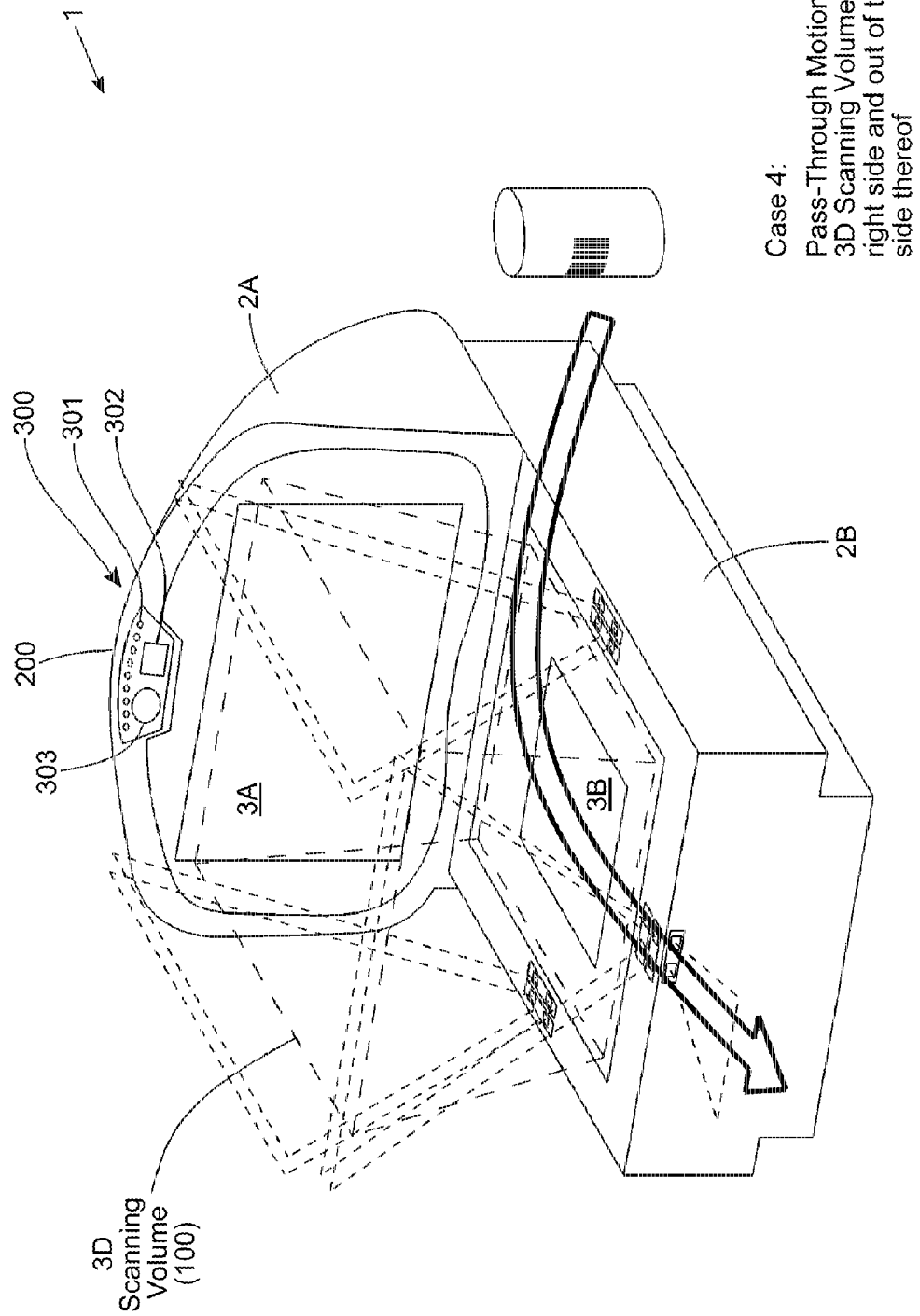

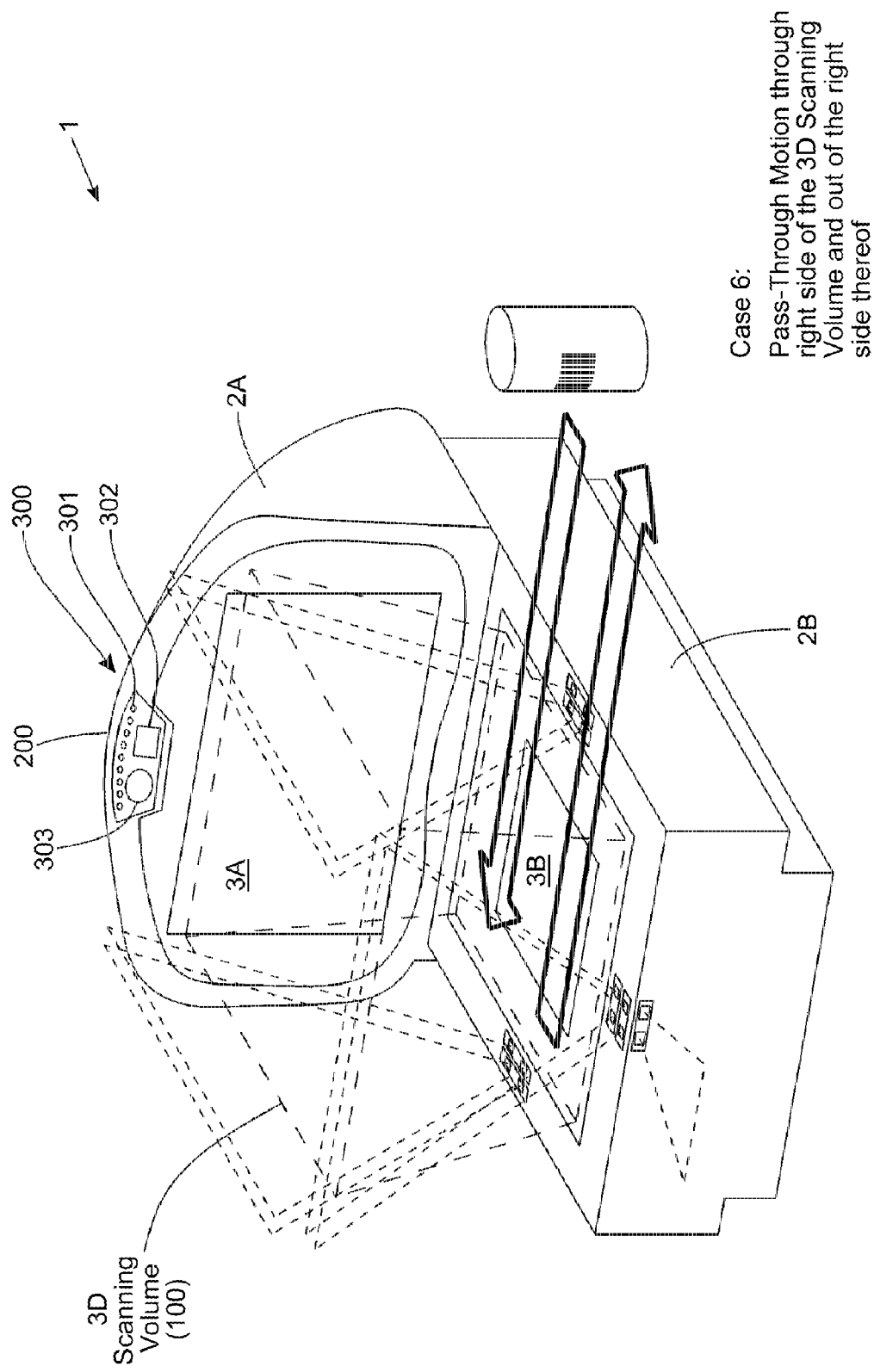

HYBRID-TYPE BIOPTICAL LASER SCANNING AND DIGITAL IMAGING SYSTEM SUPPORTING AUTOMATIC OBJECT MOTION DETECTION AT THE EDGES OF A 3D SCANNING VOLUME

CROSS-REFERENCE TO PRIORITY APPLICATION

The present application is a continuation-in-part of U.S. patent application Ser. No. 13/160,873 for a Hybrid-Type Bioptical Laser Scanning and Digital Imaging System Supporting Automatic Object Motion Detection at the Edges of a 3D Scanning Volume, filed Jun. 15, 2011 (and published Dec. 20, 2012 as U.S. Patent Application Publication No. 2012/0318869), now U.S. Pat. No. 8,561,905. The present application is also a continuation-in-part of U.S. patent application Ser. No. 13/246,936 for a Method of and System for Detecting Produce Weighing Interferences in a POS-Based Checkout/Scale System, filed Sep. 28, 2011 (and published Mar. 28, 2013 as U.S. Patent Application Publication No. 2013/0075168). Each of the foregoing patent applications, patent publications, and patent is hereby incorporated by reference in its entirety.

BACKGROUND OF DISCLOSURE

1. Field of Disclosure

The present disclosure relates generally to improvements in reading bar code symbols in point-of-sale (POS) environments in ways which increase flexibility and POS throughput.

2. Brief Description of the State of Knowledge in the Art

The use of bar code symbols for product and article identification is well known in the art. Presently, various types of bar code symbol scanners have been developed for reading bar code symbols at retail points of sale (POS).

In demanding retail environments, such as supermarkets and high-volume department stores, where high check-out throughput is critical to achieving store profitability and customer satisfaction, it is common to use laser scanning bar code reading systems having both bottom and side-scanning windows to enable highly aggressive scanner performance. In such systems, the cashier need only drag a bar coded product past these scanning windows for the bar code thereon to be automatically read with minimal assistance from the cashier or checkout personal. Such dual scanning window systems are typically referred to as "bi-optical" laser scanning systems as such systems employ two sets of optics disposed behind the bottom and side-scanning windows thereof. Examples of polygon-based bi-optical laser scanning systems are disclosed in U.S. Pat. Nos. 4,229,588, 4,652,732 and 6,814,292; each incorporated herein by reference in its entirety. Commercial examples of bi-optical laser scanners include: the PSC 8500—6-sided laser based scanning by PSC Inc.; PSC 8100/8200, 5-sided laser based scanning by PSC Inc.; the NCR 7876—6-sided laser based scanning by NCR; the NCR 7872, 5-sided laser based scanning by NCR; and the MS232x Stratos®H, and MS2122 Stratos® E 6 sided laser based scanning systems by Metrologic Instruments, Inc., and the MS2200 Stratos®S 5-sided laser based scanning system by Metrologic Instruments, Inc.

With the increasing appearance of 2D bar code symbologies in retail store environments (e.g. reading driver's licenses for credit approval, age proofing etc), there is a growing need to support digital-imaging based bar code reading—at point of sale (POS) stations.

U.S. Pat. No. 7,540,424 B2 and U.S. Publication No. 2008/0283611 A1, assigned to Metrologic Instruments, Inc, describes high-performance digital imaging-based POS bar code symbol readers employing planar illumination and digital linear imaging techniques, as well as area illumination and imaging techniques.

U.S. Pat. Nos. 7,137,555; 7,191,947; 7,246,747; 7,527,203 and 6,974,083 disclose hybrid laser scanning and digital imaging systems, in which a digital imager is integrated within a POS-based laser scanning bar code symbol reading system. In such system designs, the digital imager helps the operator read poor quality codes, and also enables the hybrid system to read 2D symbologies. The use of digital imaging at the POS is capable of capturing virtually every dimension and perspective of a bar code symbol, and is capable of making more educated decisions on how to process the symbology.

However, when using digital imaging, throughput speed at the POS is typically much less than when using a bi-optical laser scanning system, due to expected frame rates and image processing time. With digital imaging, issues may arise when objects are moved too quickly through the field of view (FOV) of the imager, producing digital images that are blurred and sometimes hard to read. Also, while the techniques disclosed in U.S. Pat. No. 7,540,424 and US Patent Application Publication No. US 2010/0302420 can reduce the effects of illumination on human observers during digital imaging at POS checkout stations, there is still a need for improvement in this regard when the continuous digital video imaging mode is preferred, without sacrificing throughput and/or performance.

Thus, despite the many improvements in both laser scanning and digital imaging based bar code symbol readers over the years, there is still a great need in the art for an improved hybrid-type bar code symbol reading system which is capable of high-performance and robust operations in demanding POS scanning environments, while avoiding the shortcomings and drawbacks of prior art systems and methodologies.

OBJECTS AND SUMMARY

Accordingly, a primary object of the present disclosure is to provide an improved hybrid-type bi-optical bar code symbol reading system for use in POS environments, which is free of the shortcomings and drawbacks of prior art systems and methodologies.

Another object is to provide a hybrid-type bi-optical bar code symbol reading system having a vertical housing section having a vertical scanning window and a horizontal housing section having a horizontal scanning window adjacent the vertical scanning window and having first, second and third edges, wherein a laser scanning subsystem projects intersecting laser scanning planes within a 3D scanning volume defined between the vertical and horizontal scanning windows, and wherein a digital imaging subsystem projects a field of view (FOV) within the 3D scanning volume when an object is detected passing through the edge of the 3D scanning volume at a particular moment in time.

Another object is to provide a hybrid-type bi-optical bar code symbol reading system, wherein the automatic object edge-motion detection subsystem comprises a plurality of object detection modules installed about the first, second and third edges of the horizontal scanning window so as to project pairs of planar object detection planes at the outer edge of the 3D scanning volume so as to be capable of automatically detecting the direction of movement of objects with respect to the edge of the 3D scanning volume, and providing control signals to the system controller for controlling the mode of operation of the hybrid scanning and imaging system.

Another object is to provide such a hybrid-type bi-optical bar code symbol reading system, wherein, each object detection module comprises a pair of optical devices generating and projecting a pair of closely spaced apart IR-based object sensing planes located about the horizontal scanning window at the edges of the 3D scanning volume.

Another object is to provide such a hybrid-type bi-optical bar code symbol reading system, wherein the automatic object edge-motion detection subsystem is capable of automatically detecting the path of travel of each object as it is moved through the 3D scanning volume during system operation, and generating control signals which are used by the system to automatically activate its digital imaging subsystem in response to such control signals and other time-based programmable variables.

Another object is to provide a hybrid-type bi-optical bar code symbol reading system, wherein the automatic object edge-motion detection subsystem is capable of automatically detecting whether or not an object is being moved in a presentation-type motion towards the vertical section of the system housing, in a pass-through type motion before the vertical and horizontal sections of the system, or in a hybrid-type motion through the 3D scanning volume, and using this detected motion to control the operation of the system.

Another object is to provide such a hybrid-type bi-optical bar code symbol reading system, wherein the automatic object edge-motion detection subsystem can be used to record cashier/operator scanning motion behavior for subsequent analysis and performance measurement, in an effort to improve cashier throughput and productivity.

Another object is to provide a hybrid-type bi-optical bar code symbol reading system that helps provide improvements in worker productivity and checkout speed and throughput.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which:

FIG. 1C is a perspective view of the digital imaging subsystem module removed from the system housing of FIG. 1B and showing projecting its field of view (FOV) from its module housing;

FIG. 4A1 is a perspective view of a single IR-based object detection module employed in the construction of the automatic object edge-motion detection subsystem in the system of FIGS. 1 through 1C;

FIG. 4A2 is a plan view of a single IR-based object detection module shown in FIG. 4A1;

FIG. 4A3 is a cross-sectional view of a single IR-based object detection module shown in FIG. 4A1, taken along line 4A3-4A3 shown therein;

FIG. 4A4 is a perspective partial phantom view of a single IR-based object detection module shown in FIG. 4A1;

FIG. 4B is a partially cut-away perspective view of the hybrid scanning and imaging code symbol reading system of FIGS. 1A through 1C, showing a second illustrative embodiment of its automatic IR-based object edge-motion detection subsystem mounted about the horizontal scanning window so as to be able to automatically detect objects passing across the edge regions of the 3D scanning volume of the system;

FIG. 5D is a perspective view of the hybrid scanning/imaging code symbol reading system of the illustrative embodiment, illustrating Case 4 namely the pass-through motion of an object into the 3D scanning volume through the right side thereof, and out of the front side thereof;

FIG. 5F is a perspective view of the hybrid scanning/imaging code symbol reading system of the illustrative embodiment, illustrating Case 6 namely the pass-through motion of an object into the 3D scanning volume through the right side thereof, and out of the right side thereof;

DETAILED DESCRIPTION OF THE ILLUSTRATIVE EMBODIMENT

Figure 1A:
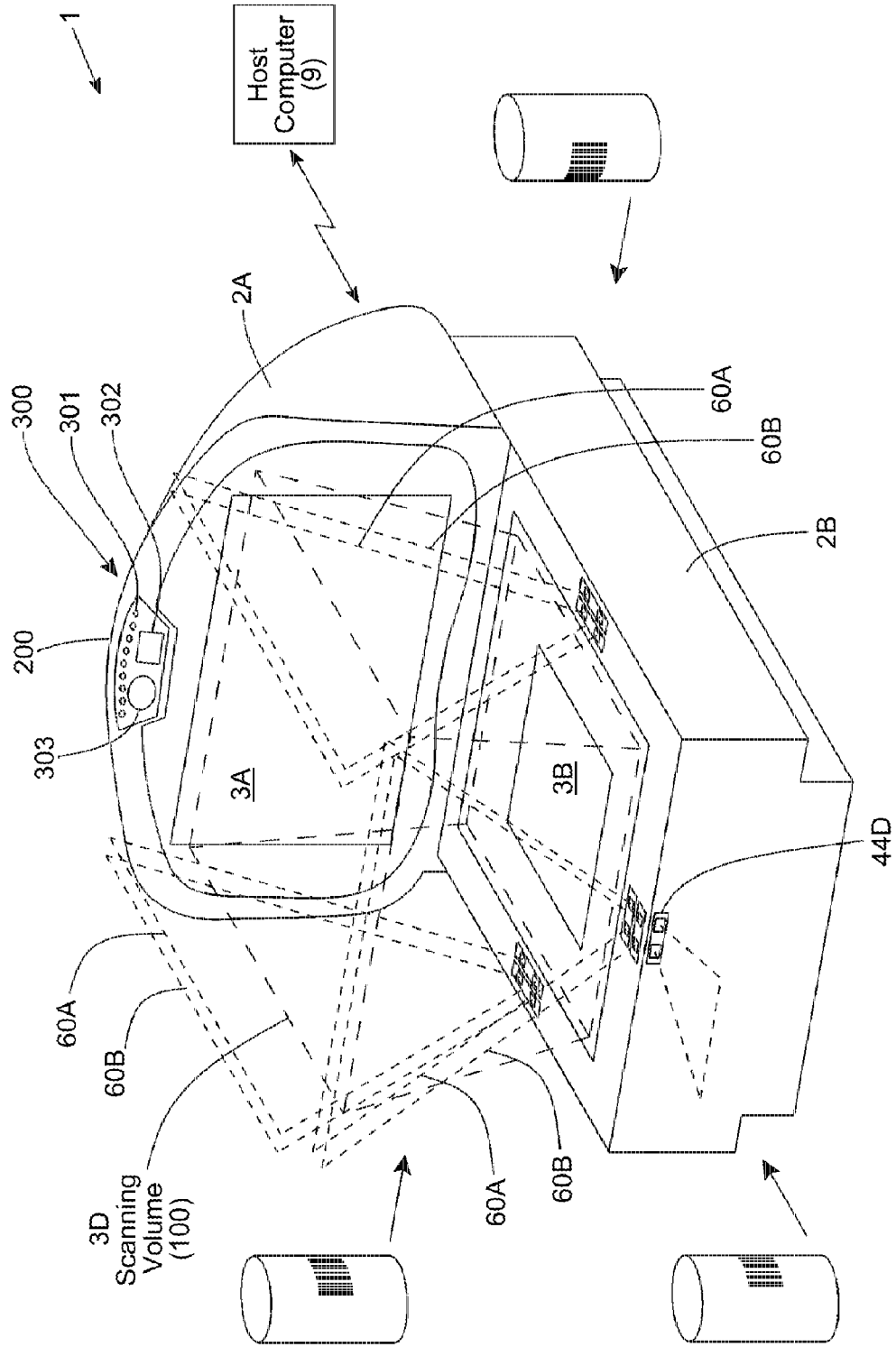
FIG. 1A is a first perspective view of an illustrative embodiment of the hybrid-type bi-optical bar code symbol reading system for installation and use at a point of sale (POS) checkout station in a retail environment, and capable of supporting several different modes of operation including a sleep mode of operation, a scanning mode of operation, and a hybrid scanning and imaging mode of operation.

Referring to the figures in the accompanying Drawings, the various illustrative embodiments of the apparatus and methodologies will be described in great detail, wherein like elements will be indicated using like reference numerals.

Figure 4A:
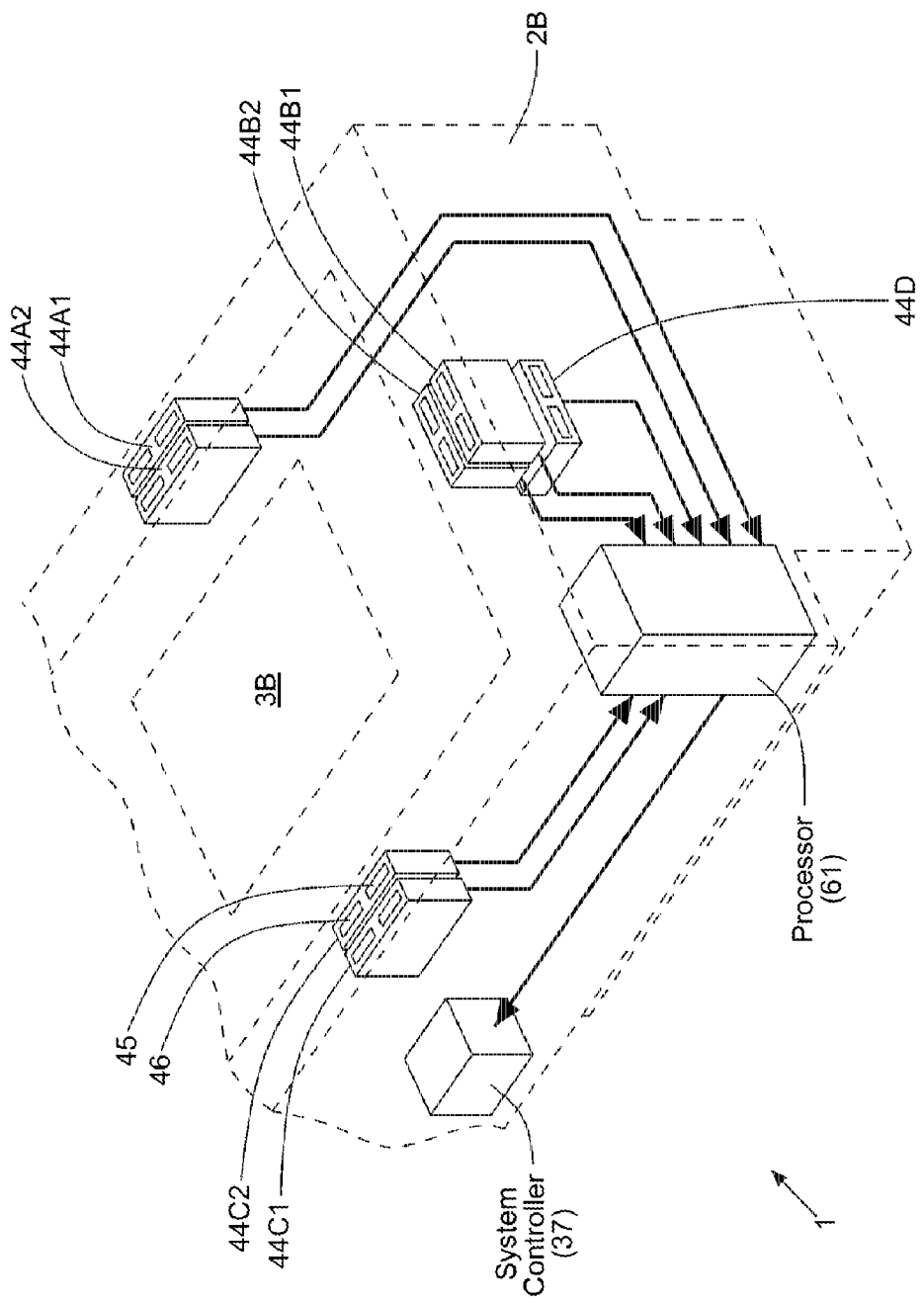
FIG. 4A is a partially cut-away perspective view of the hybrid scanning and imaging code symbol reading system of FIGS. 1A through 1C, showing a first illustrative embodiment of its automatic IR-based object edge-motion detection subsystem mounted about the horizontal scanning window so as to be able to automatically detect objects passing across the edge regions of the 3D scanning volume of the system.

FIGS. 1A through 4A4 show an illustrative embodiment of the hybrid laser-scanning/digital-imaging (i.e. scanning/imaging) based bar code symbol reading system 1 of the present disclosure supporting three different modes of operation, namely: (i) a sleep mode of operation; (ii) a laser scanning (only) mode of operation; and (iii) a hybrid scanning and imaging mode of operation. The hybrid scanning/imaging system 1 of the present disclosure, and its various modes of operation, will now be described below in great technical detail.

Figure 1B:
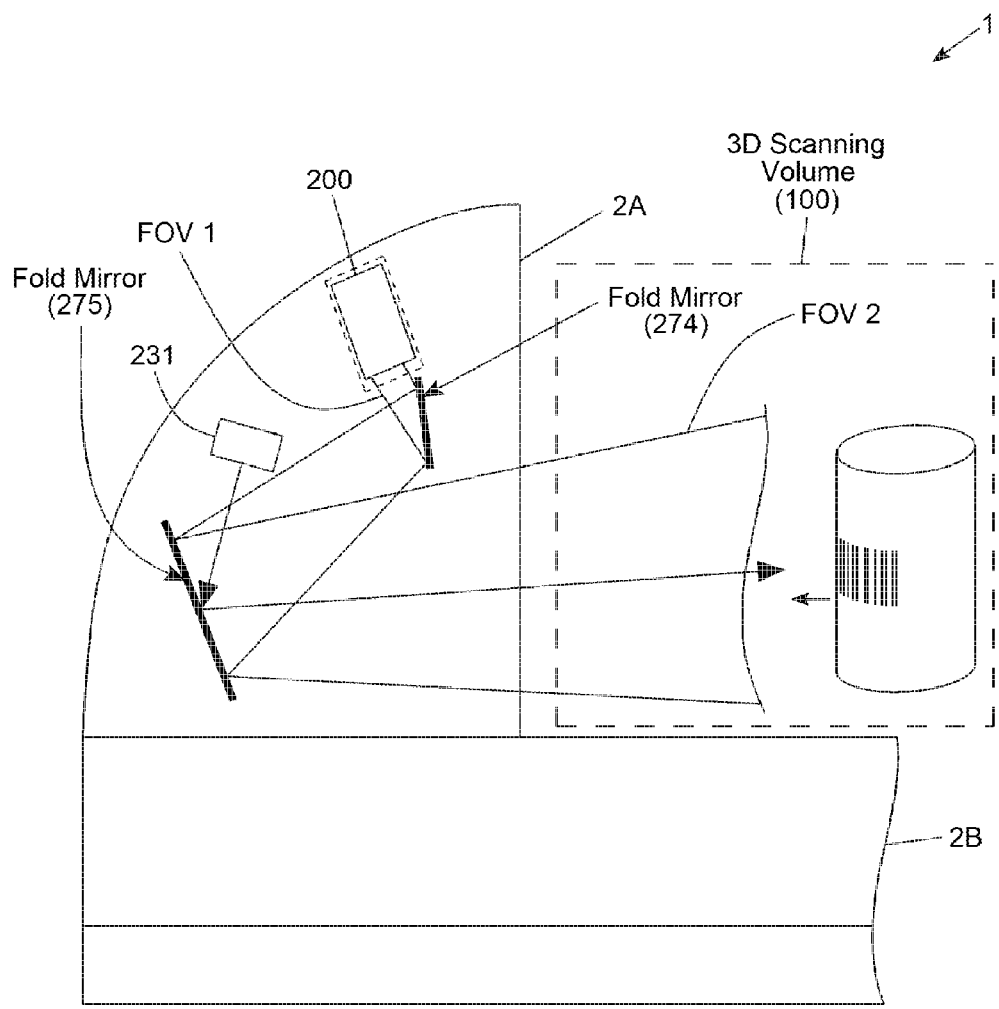
FIG. 1B is a cross-sectional side view of the hybrid-type bi-optical bar code symbol reading system of FIG. 1A, showing the FOV of digital imaging subsystem projected from the vertical housing section into the 3D scanning volume, while a light targeting beam is automatically generated when an object (e.g. bar coded product) is automatically detected within the 3D scanning volume and the system enters its hybrid scanning and imaging mode.

As shown in FIGS. 1A, 1B and 1C, the hybrid scanning/imaging code symbol reading system of the illustrative embodiment includes a system housing 2 having a vertical housing section 2A having a vertical optically transparent (glass) scanning window 3A, and a horizontal housing section 2B having a horizontal optically transparent (glass) scanning window 3B having first, second and third edges. Typically, the system is installed at a retail point of sale (POS) checkout station, well known in the art. The retail POS station will have a countertop surface, and oftentimes a conveyor belt for moving products towards the bar code symbol reading system. Also provided is a host computer system 9 that is connected to the retail LAN and/or WAN on which one or more product price database systems (RDBMS) will be deployed.

As shown, the horizontal and vertical sections 2A and 2B of the system housing are arranged in an orthogonal relationship with respect to each other such that the horizontal vertical scanning windows are substantially perpendicular. A laser scanning subsystem 15, supporting first and second laser scanning stations 15A and 15B, is mounted within the system housing, and generates and projects a complex group of laser scanning planes through laser scanning windows 3A and 3B. These laser scanning planes intersect and produce an omni-directional laser scanning pattern within a 3D scanning volume 100 defined between the vertical and horizontal scanning windows 3A and 3B, as shown in FIGS. 1 and 1C. As shown FIG. 1A, the 3D scanning volume 100 is bounded by the vertical scanning window 3A and the first, second and third edges of the horizontal scanning window 3B. In the illustrative embodiment, each laser scanning station 15A, 15B is constructed from a rotating polygon, a laser diode source, light collection optics, a photodiode, and other optical components arranged as disclosed in U.S. Pat. No. 7,422,156, incorporated herein by reference, as if set forth fully herein.

As shown in FIG. 1A, an IR-based proximity detector 44D is mounted in the front portion of the housing for automatically detecting the presence of a human operator in front of the 3D scanning volume 100 during system operation. The function of the IR-based proximity detector 44D is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 44D is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

Figure 2:
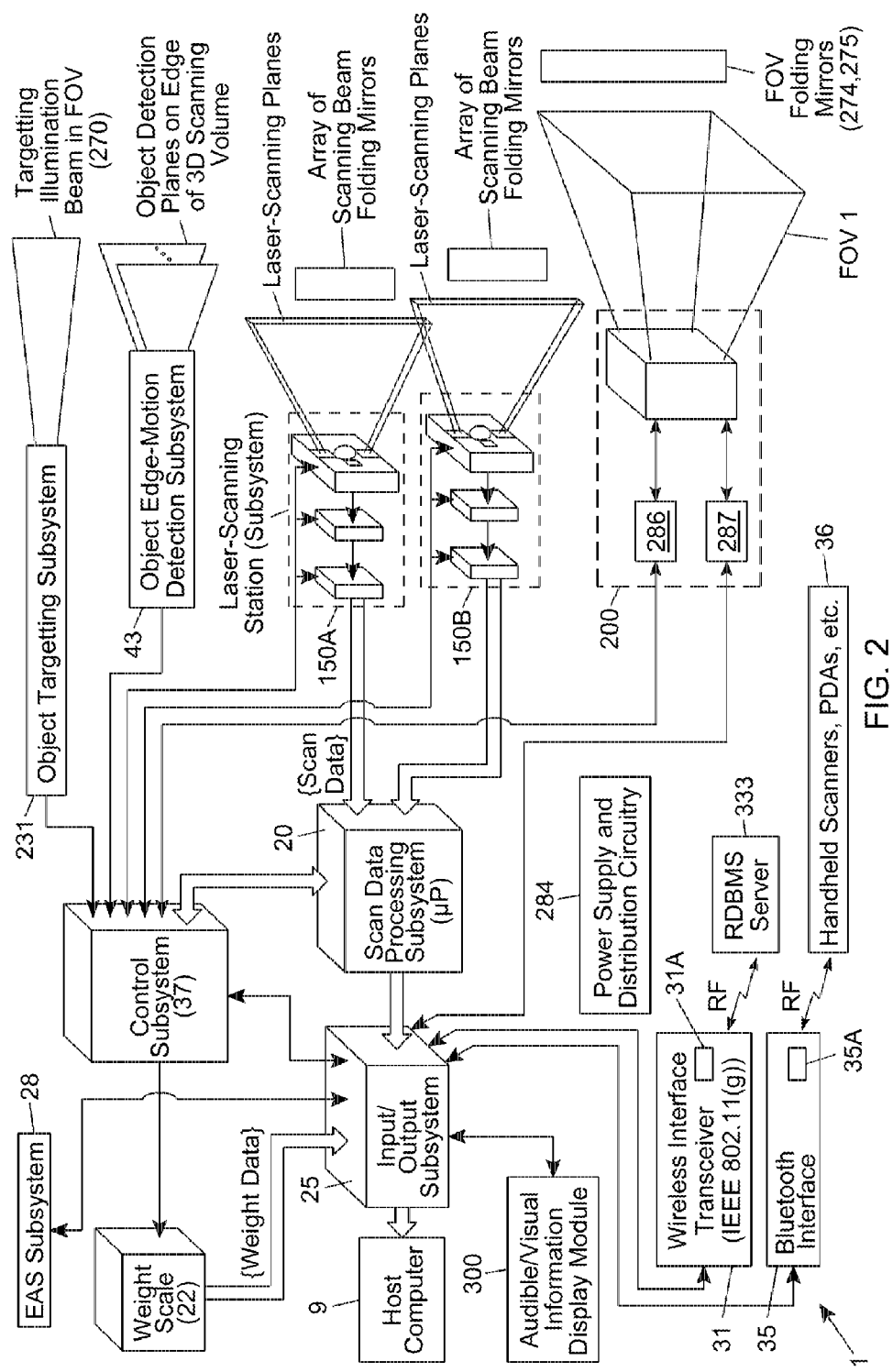
FIG. 2 is a block schematic representation of the hybrid scanning/imaging code symbol reading system of FIGS. 1A through 1C, wherein (i) a pair of laser scanning stations from the laser scanning subsystem support automatic laser scanning of bar code symbols along a complex of scanning planes projected through the 3D scanning volume of the system, and (ii) a digital imaging subsystem module, supported within the system housing, supports automatic digital imaging-based reading of bar code symbols within the 3D scanning volume of the system during the hybrid scanning and imaging mode of operation.
Figure 3:
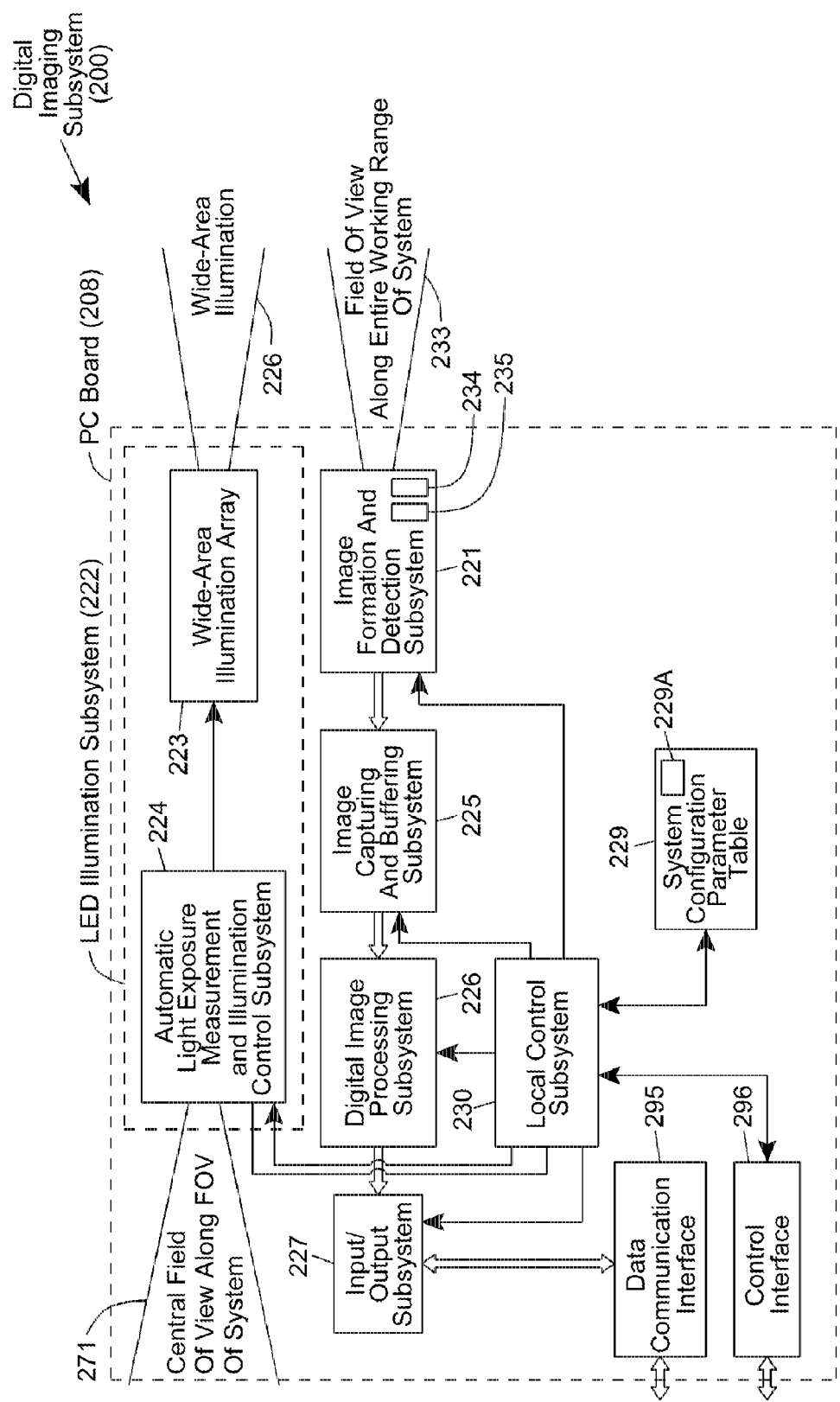
FIG. 3 is a block schematic representation of the digital imaging subsystem module supported within the hybrid scanning/imaging code symbol reading system of FIGS. 1A through 1C.

As shown in the system diagram of FIG. 2, hybrid scanning/imaging system 1 generally comprises: a laser scanning subsystem 15 including laser scanning stations 15A and 15B for generating and projecting groups of laser scanning planes through the vertical and horizontal scanning windows 3A and 3B, respectively, and generating scan data streams from scanning objects in the 3D scanning volume 100; a scan data processing subsystem (i.e. scan data processor) 20 for supporting automatic scan data processing based bar code symbol reading using scan data streams generated from stations 15A and 15B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 300, and supporting universal, standard and/or proprietary data communication interfaces with host system 9 and other external devices; a Bluetooth® RF 2-way communication interface 135 including RF transceivers and antennas 103A for connecting to Blue-tooth® enabled hand-held scanners, imagers, PDAs, portable computers 136 and the like, for control, management, application and diagnostic purposes; digital imaging subsystem module 200 specified in FIG. 3, and having data/power/control interface 294 interfacing and establishing electrical interconnections with data/power/control interface 285 as shown in FIG. 1C; a control subsystem 37 for controlling (i.e. orchestrating and managing) the operation of the laser scanning stations (i.e. subsystems), the functions of the digital imaging subsystem 200, other subsystems supported in the system; IR-based wake-up detector 67, operably connected to the control subsystem 37, for generating and supplying a first trigger signal to the system controller in response to automatic detection of an operator in proximity (e.g. 1-2 feet) of the system housing; and automatic object edge-motion detection subsystem 44 for detecting the motion of objects entering and exiting the 3D scanning volume 100; an object targeting illumination subsystem 231, illustrated in FIG. 1B, for generating a narrow-area targeting illumination beam 270 into the FOV to help allow the user align bar code symbols within the active portion of the FOV where imaging occurs; an IR-based object edge-motion detection subsystem 43 for producing IR-based planar object detection fields at the edge of the 3D scanning volume 100 of the system, as shown in FIGS. 1A and 4; and an optional, object targeting subsystem 231 for generating and projecting a visible targeting illumination field 270 within the FOV of the digital imaging subsystem, in response to control signals generated by the system controller 37. In FIG. 2, the bar code symbol reading module employed along each channel of the scan data processing subsystem 20 can be realized using conventional bar code reading techniques, including bar code symbol stitching-based decoding techniques, well known in the art.

As shown in FIG. 1B, the digital imaging subsystem 200 is mounted as a module within the vertical section of the system housing, and includes an optical element 210 which modifies the optical characteristics of its field of view (FOV1). The FOV is then folded several times by way of FOV folding mirrors 274 through 275, to provide a modified field of view (FOV2) that extends through the vertical scanning window 3A, into the 3D scanning volume 100, as shown in FIG. 1B. While not a requirement, one or more of these FOV folding mirrors may be supplied by laser scanning pattern folding mirrors provided in the vertical housing section of the system housing. Preferably, the resulting field of view (FOV2) will extend deep inches into the 3D scanning volume (e.g. 12 inches or more), with a substantial depth of focus (e.g. 3-12 inches) before the vertical scanning window 3A. During the hybrid scanning/imaging mode of operation, the FOV spatially overlaps a substantial portion of the 3D scanning volume 100 of the system.

As shown in FIG. 3, the digital imaging subsystem 200 employed in the illustrative embodiment of the hybrid scanning/imaging system 1 is realized from a number of components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing an LED illumination array 232 for producing a field of narrow-band wide-area illumination 226 within the entire FOV 233 of the image formation and detection subsystem 221, which is reflected from the illuminated object and transmitted through a narrow-band transmission-type optical filter 540 detected by the image detection array 35, while all other components of ambient light are substantially rejected; an automatic light exposure measurement and illumination control subsystem 224 for controlling the operation of the LED-based illumination subsystem 222; an image capturing and buffering subsystem 225 for capturing and buffering 2-D images detected by the image formation and detection subsystem 221; a digital image processing subsystem (i.e. digital image processor) 226 for processing 2D digital images captured and buffered by the image capturing and buffering subsystem 225 and reading 1D and/or 2D bar code symbols represented therein; an input/output subsystem 527 for outputting processed image data (e.g. symbol character data) and the like (e.g. raw image data files) to an external host system 9; a system memory 229 for storing data implementing a configuration table 229A of system configuration parameters (SCPs); data/power/control interface 294 including a data communication interface 295, a control interface 296; a Bluetooth communication interface, interfaced with I/O subsystem 227; and a system control subsystem (i.e. system controller) 230 integrated with the subsystems above, for controlling and/or coordinating the subsystems of the digital imaging subsystem 200 during system operation.

The primary function of the object targeting subsystem 231 is to automatically generate and project a visible linear-targeting illumination beam across the FOV of the system during the hybrid scanning and imaging mode of operation. In order to implement the object targeting subsystem 231, a pair of visible LEDs can be arranged on opposite sites of the FOV optics 234, or located elsewhere within the vertical section of the system housing, so as to generate a linear visible targeting beam 270 that is projected into the FOV of the digital imaging subsystem 200.

The image formation and detection subsystem 221 includes image formation (camera) optics 234 for providing the field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 36 from the LED array 223 when an object is automatically detected within the FOV. Notably, the field of illumination has a narrow optical-bandwidth and is spatially confined within the FOV of the image formation and detection subsystem 521 during modes of illumination and imaging, respectively. This arrangement is designed to ensure that only narrow-band illumination transmitted from the illumination subsystem 222, and reflected from the illuminated object, is ultimately transmitted through a narrow-band transmission-type optical filter subsystem 240 within the system and reaches the CMOS area-type image detection array 235 for detection and processing, whereas all other components of ambient light collected by the light collection optics are substantially rejected at the image detection array 535, thereby providing improved SNR, thus improving the performance of the system.

The narrow-band transmission-type optical filter subsystem 240 is realized by (1) a high-pass (i.e. red-wavelength reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors employed in the module.

The automatic light exposure measurement and illumination control subsystem 224 performs two primary functions: (1) to measure, in real-time, the power density [joules/cm] of photonic energy (i.e. light) collected by the optics of the system at about its image detection array 235, and to generate auto-exposure control signals indicating the amount of exposure required for good image formation and detection; and (2)

in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235.

The primary function of the image capturing and buffering subsystem 225 is (1) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured.

Notably, in the illustrative embodiment, the digital imaging subsystem 200 has both single-shot and video modes of imaging. In the single shot mode, a single 2D image frame (31) is captured during each image capture and processing cycle, or during a particular stage of a processing cycle. In the video mode of imaging, the system 200 continuously captures frames of digital images of objects in the FOV. These modes are specified in further detail in US Patent Publication No. 2008/0314985 A1, incorporated herein by reference in its entirety.

The primary function of the digital image processing subsystem (i.e. digital image processor) 226 is to process digital images that have been captured and buffered by the image capturing and buffering subsystem 225, during modes of illumination and operation. Such image processing operations include image-based bar code decoding methods as described in U.S. Pat. No. 7,128,266, incorporated herein by reference.

The primary function of the input/output subsystem 227 is to support data communication interfaces with input/output subsystem 25. Examples of such interfaces, and technology for implementing the same, are given in U.S. Pat. No. 6,619,549, incorporated herein by reference.

The primary function of the system control subsystem 230 is to provide some predetermined degree of control, coordination and/or management signaling services to each subsystem component integrated within the digital imaging subsystem 200. Subsystem 200 can be implemented by a programmed microprocessor, or by the three-tier software architecture supported on micro-computing platform, as described in U.S. Pat. No. 7,128,266, incorporated herein by reference.

The primary function of the system configuration parameter (SCP) table 229A in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending US Publication No. 2008/0314985 A1, incorporated herein by reference.

As shown in FIGS. 4 through 4A4, automatic object edge-motion detection subsystem 43 comprises three spatially separated coplanar object detection modules 44A1, 44A2 44B1, 44B2 and 44C1, 44C2, each pair being located at an edge of the 3D scanning volume 100. As best shown in FIG. 1A, each pair of modules 44A1, 44A2, 44B1, 44B2, and 44C1 44C2 generates a pair of closely parallel IR-based detection beams 60A, 60B, which are projected substantially normal to the horizontal scanning window 3B, so as to automatically detect when an object enters and leaves (i.e. exits) the 3D scanning volume during operation of the system. Each module 44 comprises an and a IR photo-receiver for receiving reflections of the amplitude modulated IR beam, using a synchronous detection circuitry, well known in the art. Each coplanar object detection module comprises: light transmission apertures 45 and 46 formed in a block or module 47, in co-aligned spatial relationship; a IR photo-transmitter (i.e. IR LED) 48 mounted on a printed circuit (PC) board 52, for generating a high-frequency amplitude modulated IR beam, supported in the module and provided with a cylindrical lens 48A to produce a planar IR light beam 50; an IR photo-receiver (i.e. IR photodiode) 51 mounted on PC board 52 within the block 47 for receiving over its FOV 53, return light generated by IR LED 48 and transmitted through aperture 46, in a coplanar manner with the planar IR beam 50, to produce a coplanar IR object illumination and detection plane 60 from the module 44. During operation, the amplitude modulated IR LED 48 is generated while the planar IR photodiode 51 synchronously detects through aperture 46, light energy reflected/scattered off objects in the FOV 53. As shown in FIG. 4, the outputs of each of the six object detection modules 44A1 through 44C2 are provided to processor 61, for processing and generation of control signals indicating at least the following detected conditions: when an object enters 3D scanning volume 100; when an object leaves 3D scanning volume 100; when an object undergoes pass-through motion; and when an object undergoes presentation motion.

FIGS. 5A through 5I describe various examples of pass-through and presentation motion that an object can experience when being scanned and/or imaged using the hybrid system. By monitoring and collecting object motion information, into and out of the 3D scanning volume 100, during system operation, the system controller is capable of controlling the digital imaging subsystem 200 in a more optimal manner, i.e. activating the imaging subsystem when needed most at the POS station. Also, the automatic object edge-motion detection subsystem 43 can be used to record cashier/operator scanning motion behavior for subsequent analysis and performance measurement, in effort to improve cashier throughput and productivity.

Figure 6A:
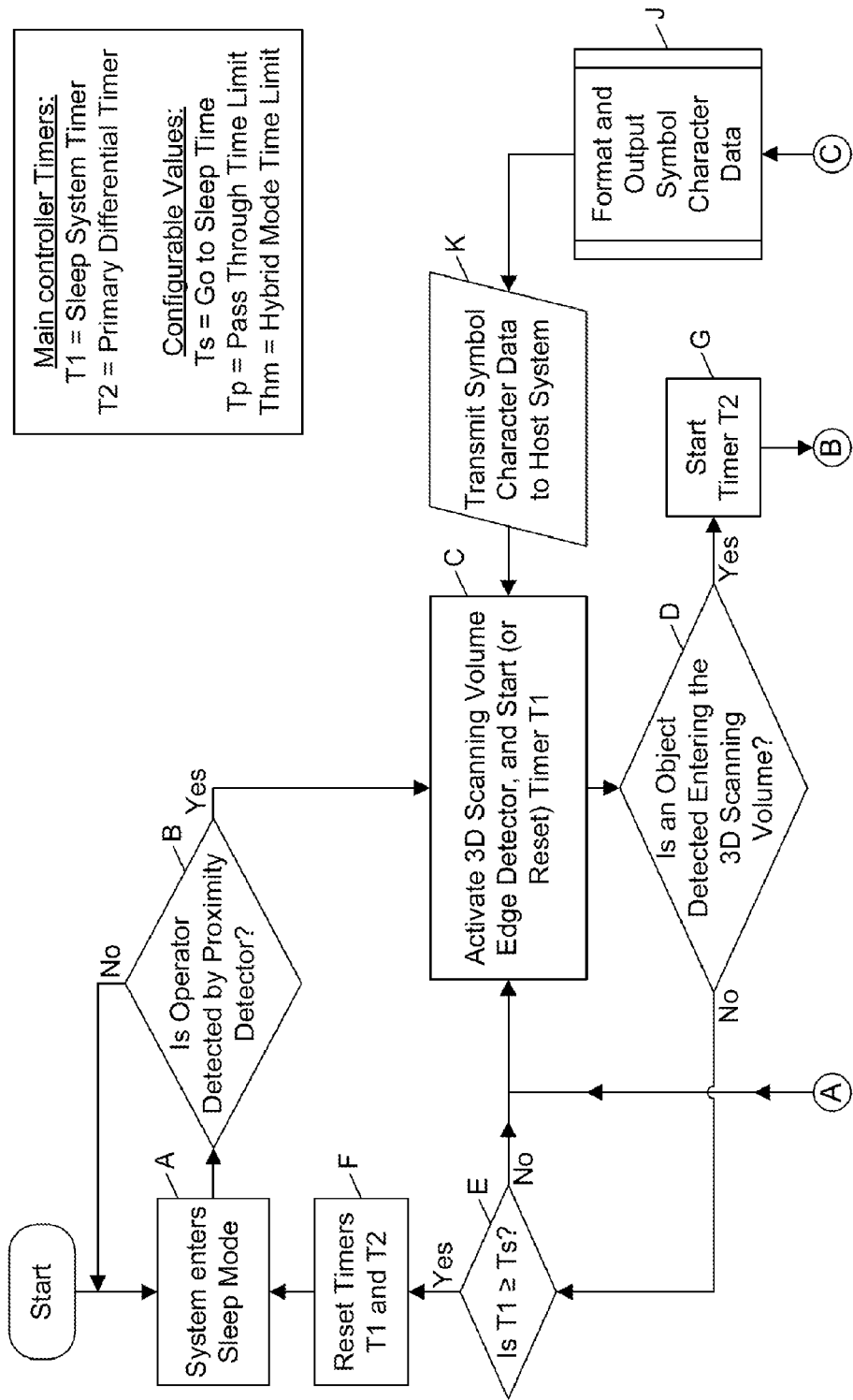
FIGS. 6A and 6B, taken together, set forth a flow chart describing the control process supported by the system controller within the hybrid scanning/imaging code symbol reading system of the first illustrative embodiment, during its various modes of operation.
Figure 6B:
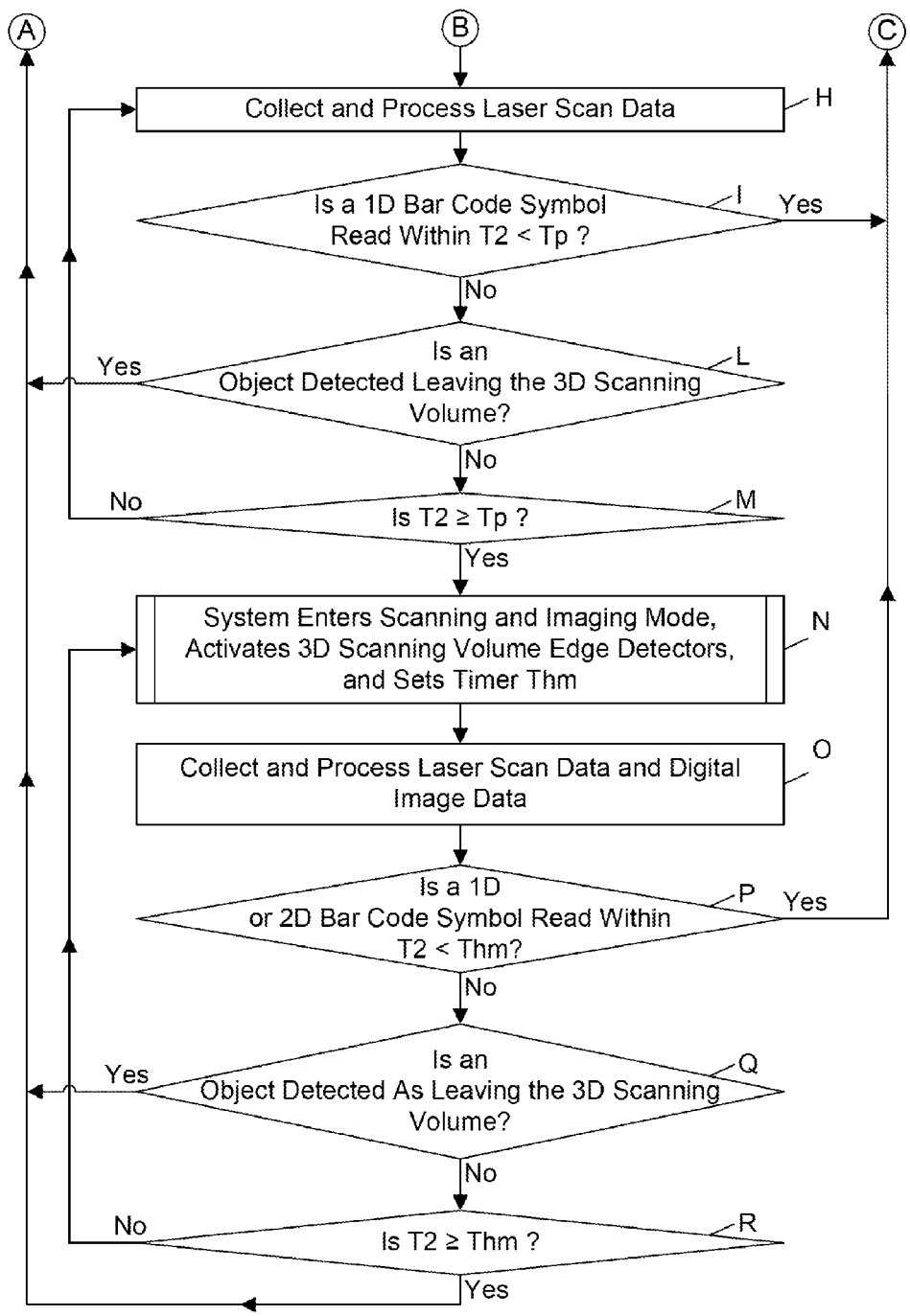

FIGS. 6A and 6B describe the control process supported by the system controller within the bi-optical hybrid scanning/imaging code symbol reading system of the first illustrative embodiment.

Figure 5A:
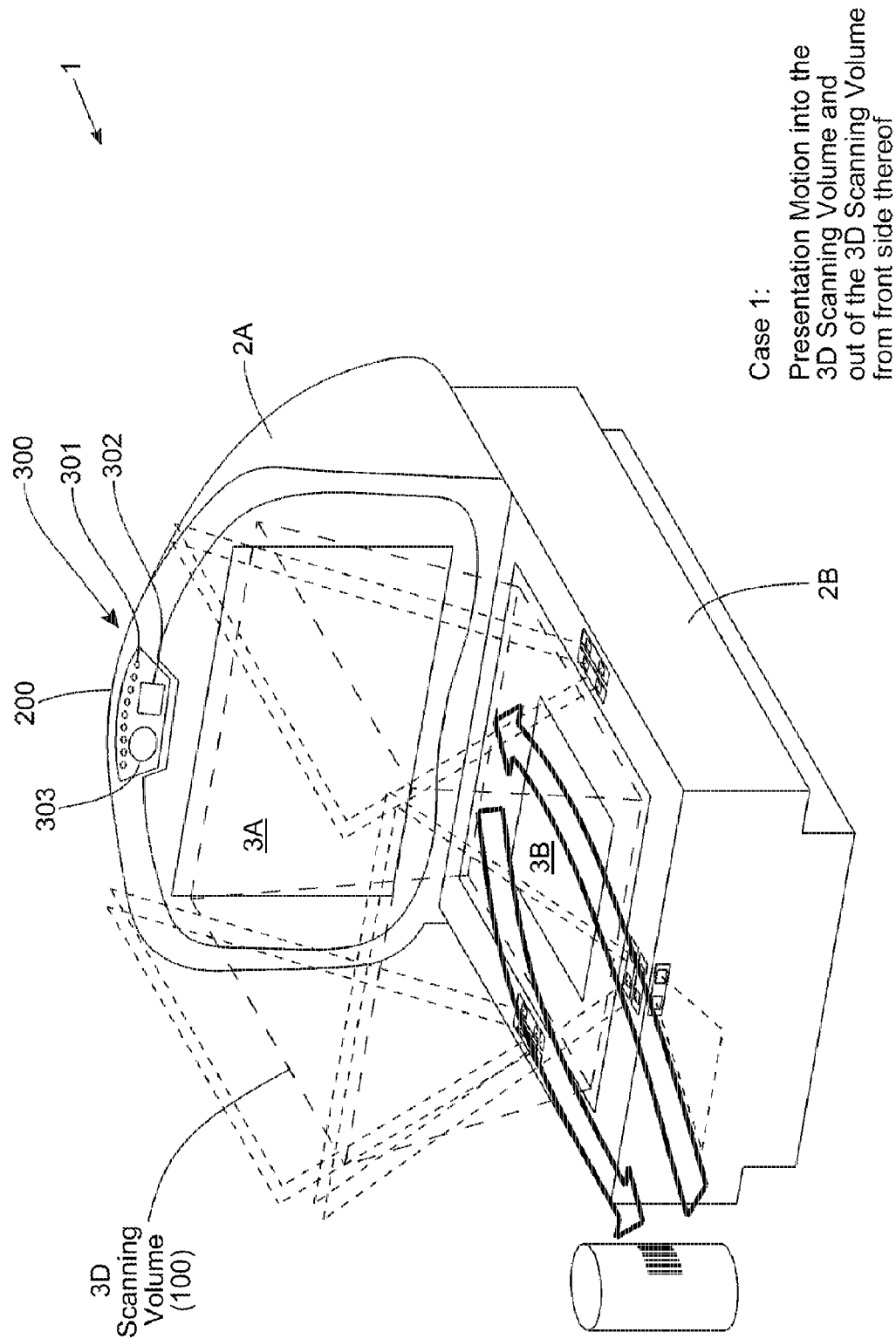
FIG. 5A is a perspective view of the hybrid scanning/imaging code symbol reading system of the illustrative embodiment, illustrating Case 1 namely the presentation motion of an object into the 3D scanning volume and out of the 3D scanning volume from the front side thereof.
Figure 5B:
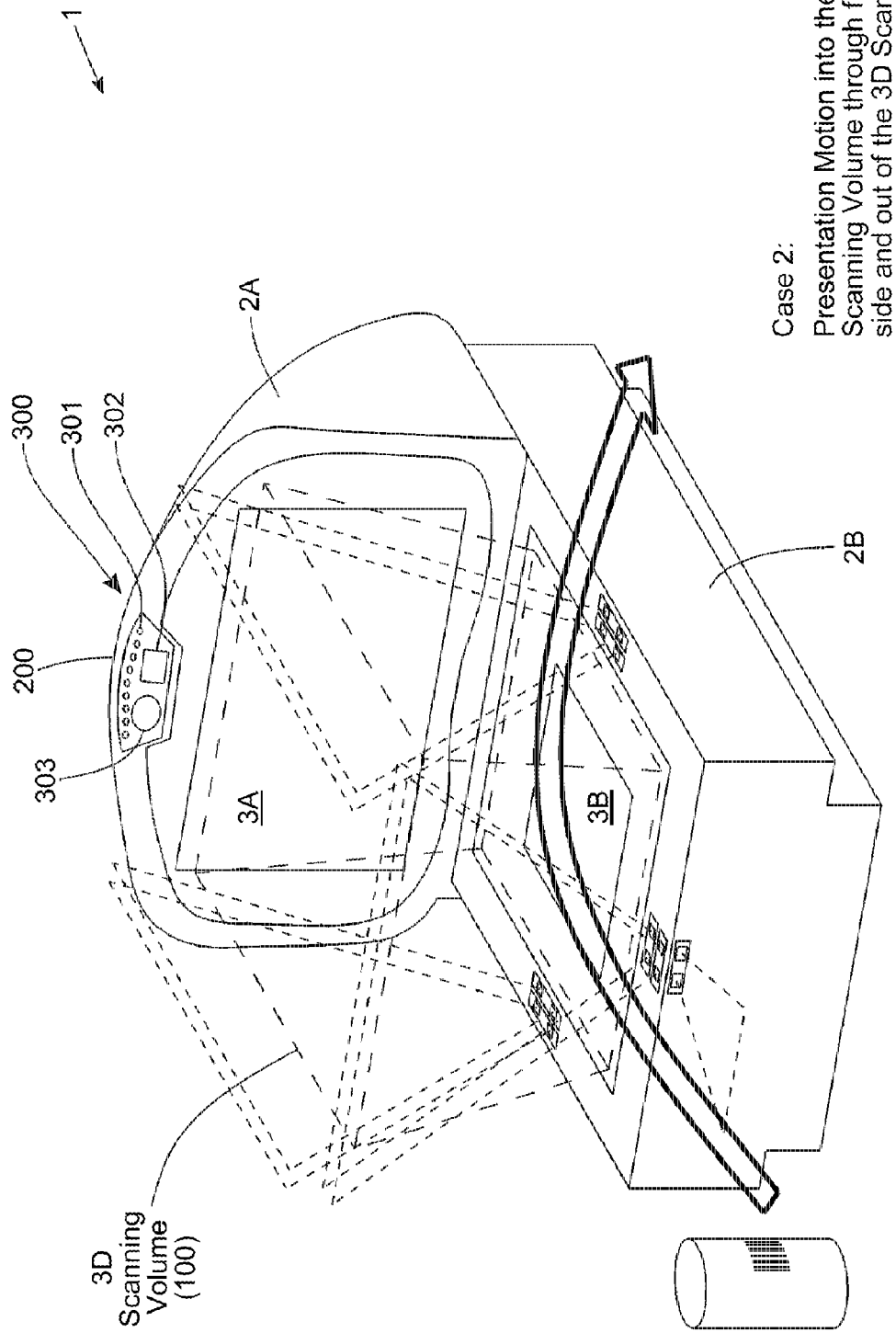
FIG. 5B is a perspective view of the hybrid scanning/imaging code symbol reading system of the illustrative embodiment, illustrating Case 2 namely the presentation motion of an object into the 3D scanning volume through the front side and out of the 3D scanning volume from the right side thereof.
Figure 5C:
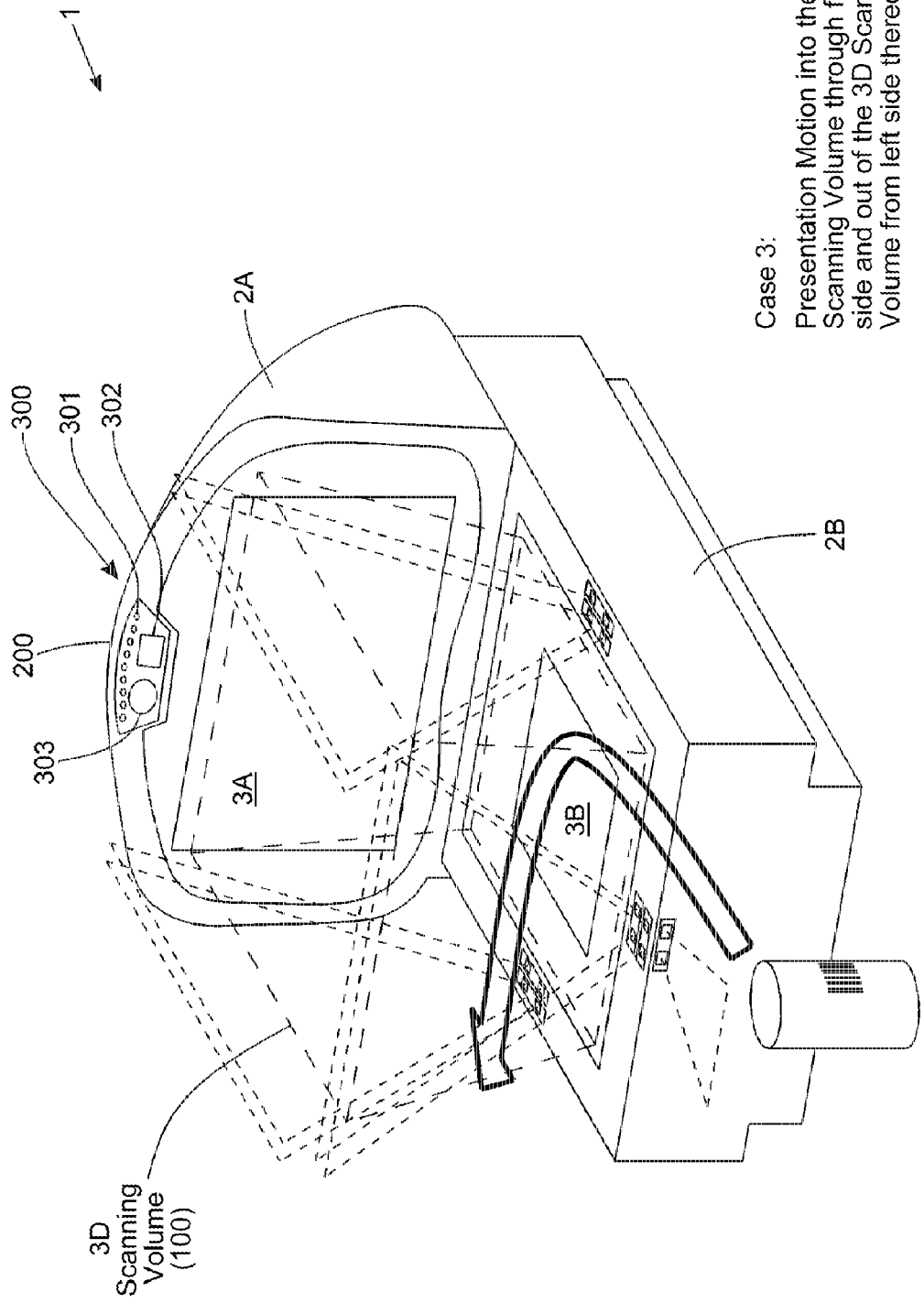
FIG. 5C is a perspective view of the hybrid scanning/imaging code symbol reading system of the illustrative embodiment, illustrating Case 3 namely the presentation motion of an object into the 3D scanning volume through the front side of the 3D scanning volume and out the 3D scanning volume from the left side thereof.
Figure 5E:
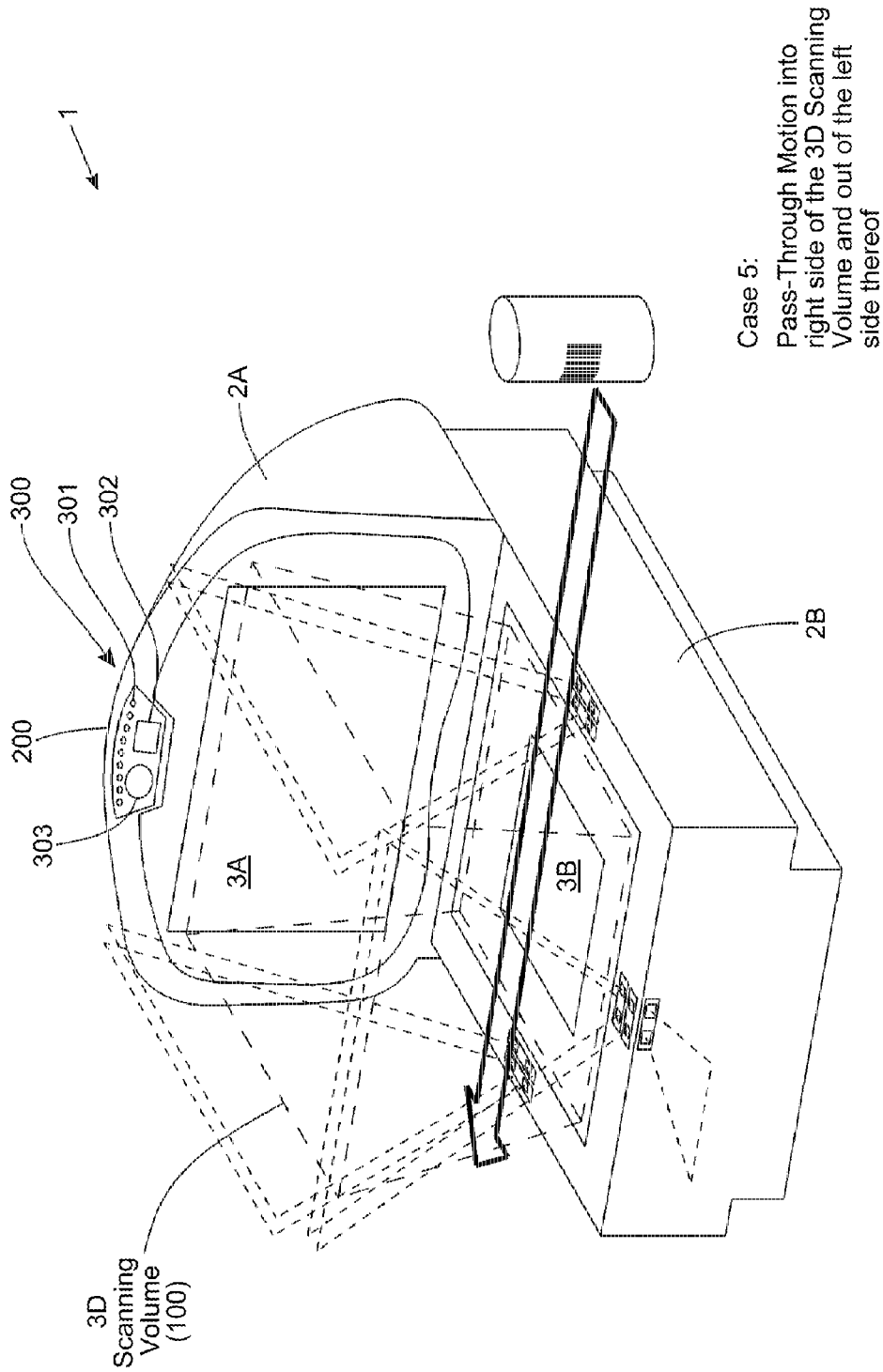
FIG. 5E is a perspective view of the hybrid scanning/imaging code symbol reading system of the illustrative embodiment, illustrating Case 5 namely the pass-through motion of an object into the 3D scanning volume through the right side thereof, and out of the left side thereof.
Figure 5G:
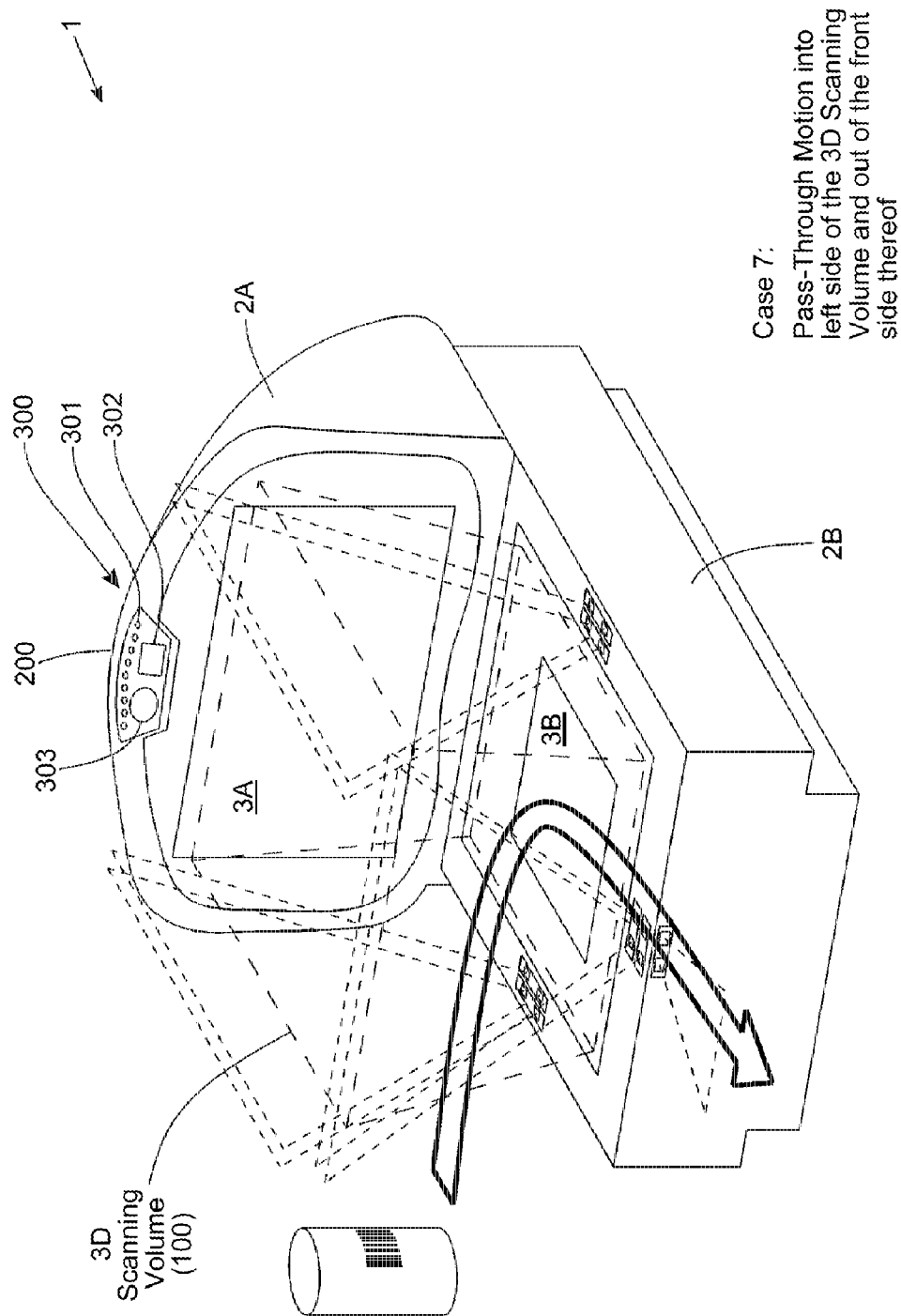
FIG. 5G is a perspective view of the hybrid scanning/imaging code symbol reading system of the illustrative embodiment, illustrating Case 7 namely the pass-through motion of an object into the 3D scanning volume through the left side thereof, and out of the front side thereof.
Figure 5H:
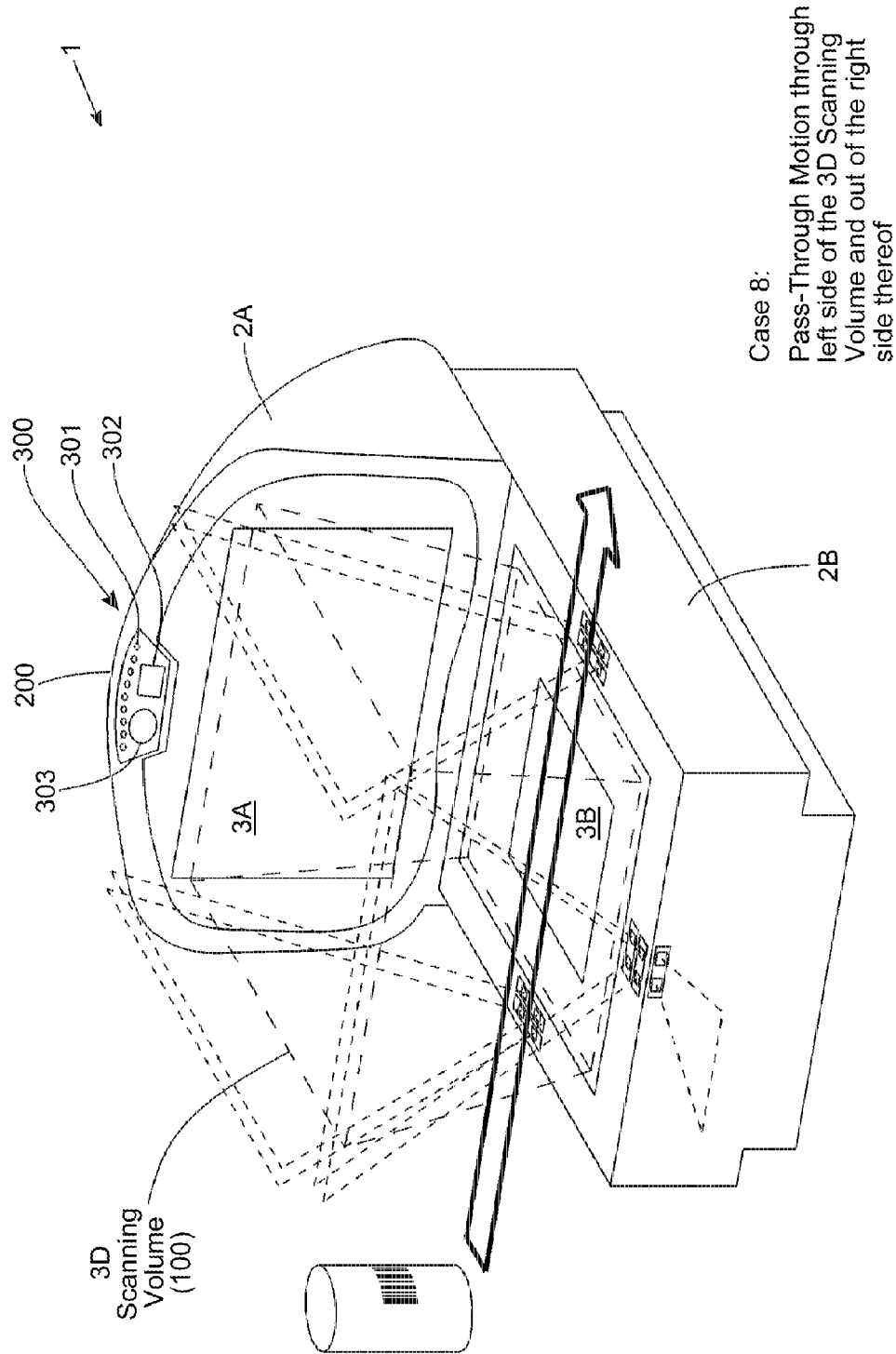
FIG. 5H is a perspective view of the hybrid scanning/imaging code symbol reading system of the illustrative embodiment, illustrating Case 8 namely the pass-through motion of an object into the 3D scanning volume through the left side thereof, and out of the right side thereof.
Figure 5I:
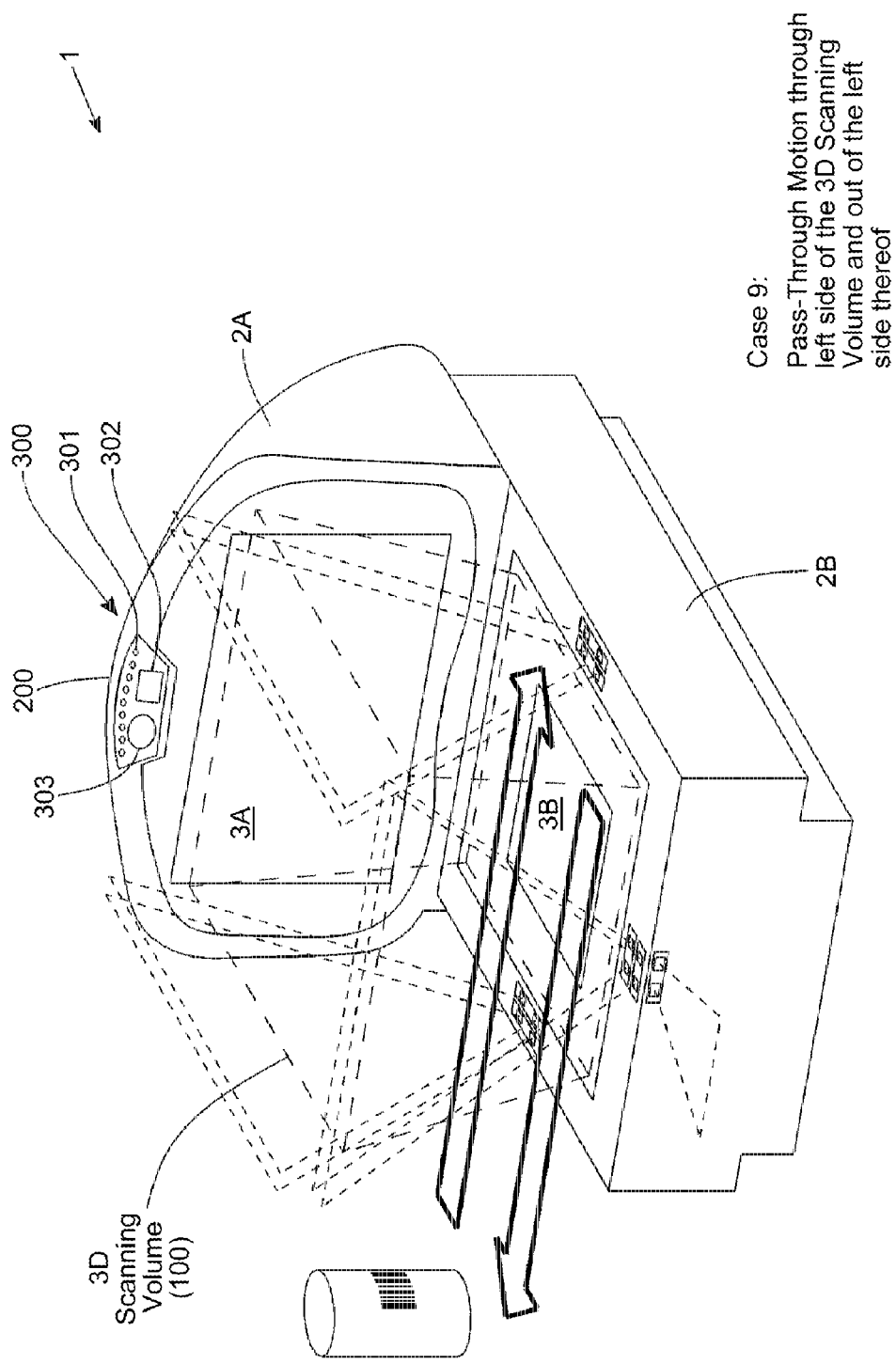
FIG. 5I is a perspective view of the hybrid scanning/imaging code symbol reading system of the illustrative embodiment, illustrating Case 9 namely the pass-through motion of an object into the 3D scanning volume through the left side thereof, and out of the left side thereof.
Figure 5J:
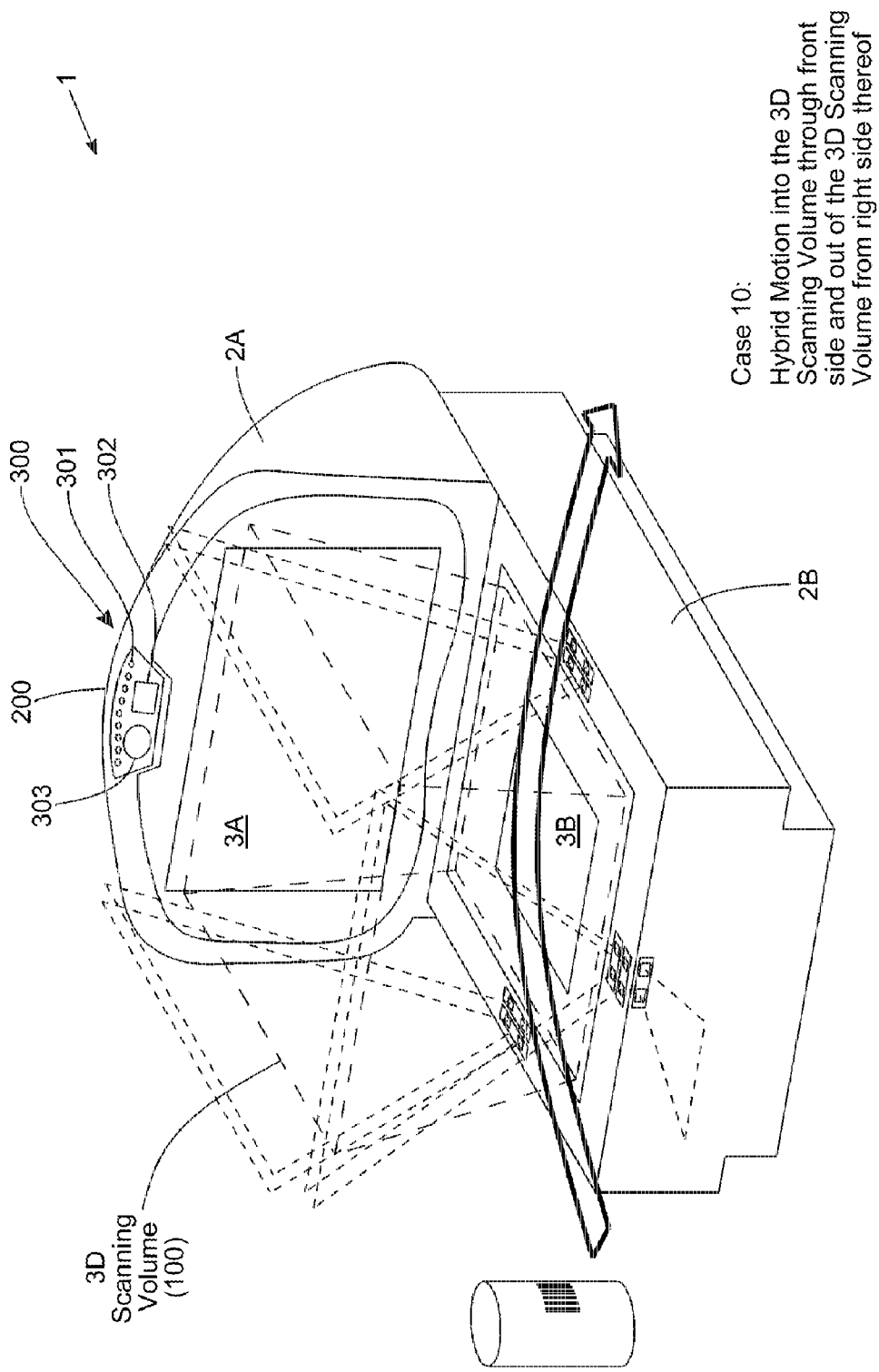
FIG. 5J is a perspective view of the hybrid scanning/imaging code symbol reading system of the illustrative embodiment, illustrating Case 10 namely hybrid-type motion of an object into the 3D scanning volume through the left front corner thereof, and out of the right side thereof.
Figure 5K:
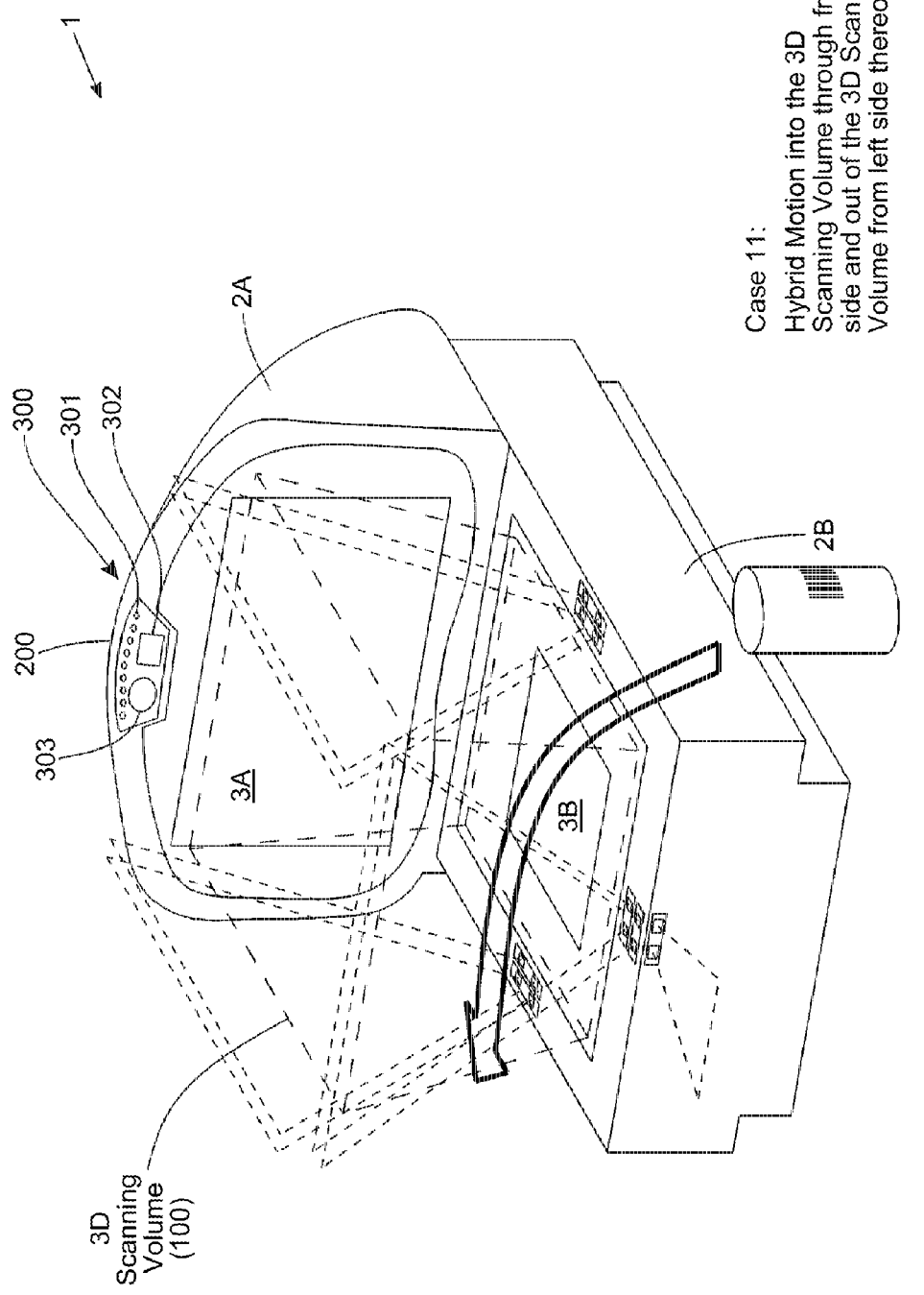
FIG. 5K is a perspective view of the hybrid scanning/imaging code symbol reading system of the illustrative embodiment, illustrating Case 11 namely the hybrid-type motion of an object into the 3D scanning volume through the right front corner thereof, and out of the left side thereof.

At the START Block in FIG. 5A, the system is initialized and programmable/configurable parameters or variables are reset, and at Block A, the system enters its SLEEP mode.

At Block B, the system controller determines whether or not the operator is detected by proximity detector 44D. If not, then the system controller returns to Block A, and if an operator is detected, then the system proceeds to Block C and activates the 3D scanning volume edge detector (i.e. object edge-motion detection subsystem 43), and starts (or resets) Timer T1.

At Block D, the system controller determines whether or not an object is detected entering the 3D Scanning Volume, and if not, the proceeds to Block E, and determines if Timer T1>Ts. If so, then at Block F, the system controller resets Timers T1 and T2. If not, then the system controller returns to Block C.

If at Block G, an object is detected as entering the 3D scanning volume, then the system controller starts Timer T2, and at Block H, collects and processes laser scan data in effort to read a 1D bar code symbol.

At Block I, the system controller determines whether or not a 1D bar code symbol is read within T2<Tp. In the event that a 1D bar code symbol has been read, then at Block J the symbol character data is formatted and at Block K is transmitted to the host system 9, and then the system returns to Block C, as indicated in FIG. 6A.

If at Block I, a 1D bar code symbol is not decoded within T2<Tp, then the system controller determines whether or not an object is detected as leaving the 3D scanning volume, and if so, then returns to Block C, as indicated in FIGS. 6A and 6B.

If an object is not detected leaving the 3D scanning volume at Block L, then the system controller determines at Block M whether or not T2> or =Tp.

If the condition T2> or =Tp is not met at Block M, then the system controller returns to Block H and continues to collect and process laser scan data in effort to read a 1D bar code symbol. However, it this timer condition is met at Block M, then the system controller advances to Block N and the system enters the scanning and imaging mode, activates the 3D scanning volume edge detectors, and sets Timer Thm.

Then at Block O, the system controller collects and processes laser scan data and digital image data so as to read 1D and/or 2D bar code symbols.

At Block P, the system controller determines whether or not a 1D or 2D bar code symbol is read within T2<Thm, and if so, then the system controller proceeds to Block C. In the event that no 1D or 2D bar code symbol is read within T2<Thm, then the system controller proceeds to Block Q and determines whether or not an object an object is detected as leaving the 3D scanning volume.

In the event that an object is detected leaving the 3D scanning volume at Block Q, then the system controller returns to Block C indicated in FIGS. 6A and 6B. In the event that an object is not detected leaving the 3D scanning volume at Block Q, then the system controller advances to Block R. At Block R, the system controller determines whether or not T2>Thm, and if not, then returns to Block H, as shown in FIG. 6B. However, in the event that T2>Thm, then the system controller returns to Block C, as indicated in FIGS. 6A and 6B.

Figure 7:
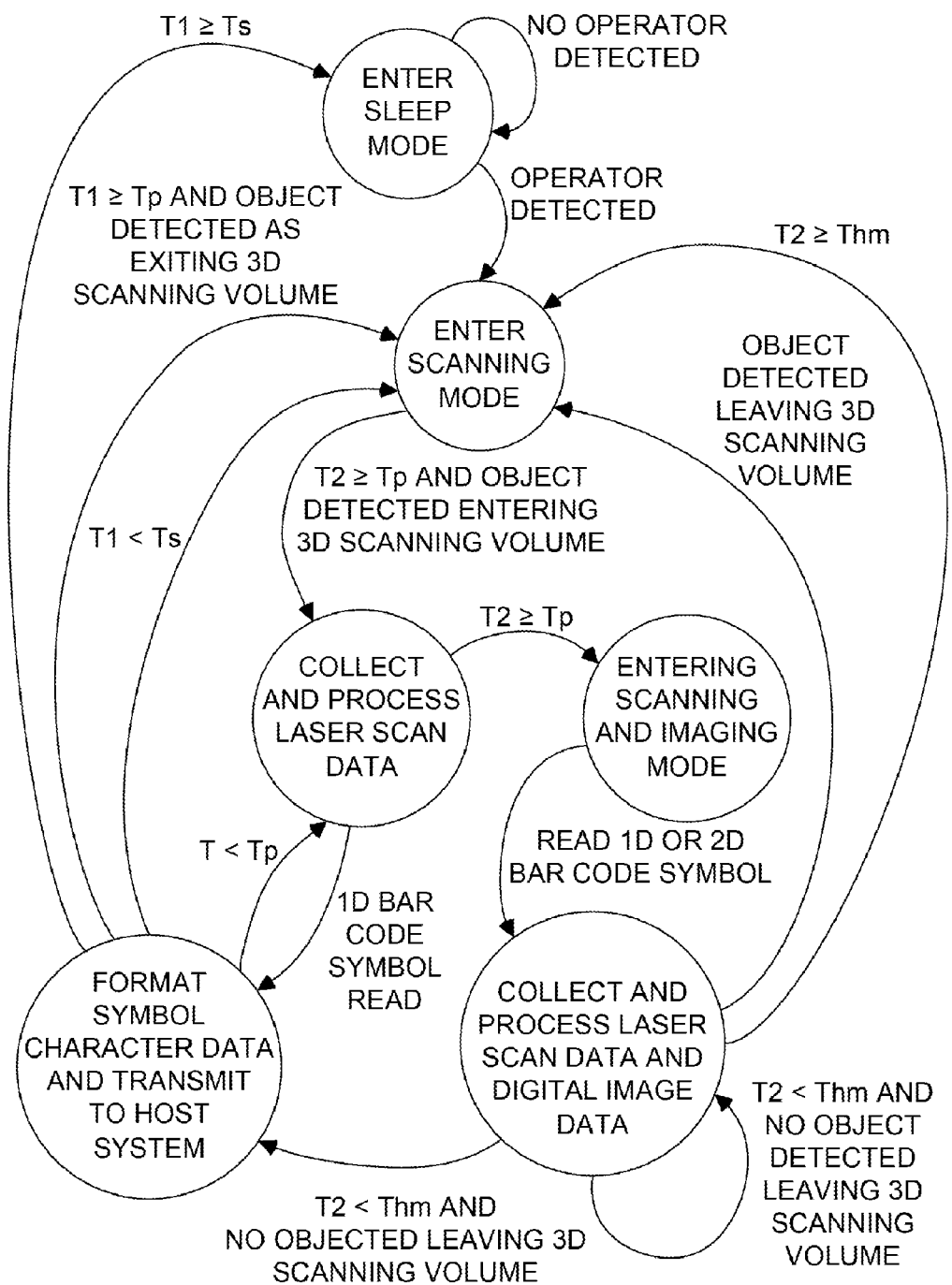
FIG. 7 is a state transition diagram for the hybrid scanning/imaging code symbol reading system of the illustrative embodiment, whose operation is specified in the flow chart of FIGS. 6A and 6B.

FIG. 7 shows a state transition diagram for the system control process described in the flow chart of FIGS. 6A and 6B. As shown, the primary states of this system are: Enter Sleep Mode; Enter Scanning Mode; Collect And Process Laser Scan Data; Format Symbol Character Data And Transmit To Host System; Entering Scanning And Imaging Mode; And Collect And Process Laser Scan Data And Digital Image Data.

As shown in FIG. 7, events that can cause a transition in the state of the system include: No Operator Detected; Operator Detected; T2>Tp And Object Detected Entering 3d Scanning Volume; 1d Bar Code Symbol Read; T1<Ts; T1> Or =Tp And Object Detected As Exiting 3d Scanning Volume; T1> Or =Ts; T<Tp; T2> Or =Tp; Read 1d Or 2d Bar Code Symbol; T2<Thm And No Objected Leaving 3d Scanning Volume; T2<Thm And No Object Detected Leaving 3d Scanning Volume; Object Detected Leaving 3d Scanning Volume; T2> Or =Thm. Notably, the system control process and associated state transitions are for illustration purposes only, and that it is understood that diverse kinds of system configurations and operations may be implemented in any given application at hand, using the various techniques disclosed herein.

Figure 8A:
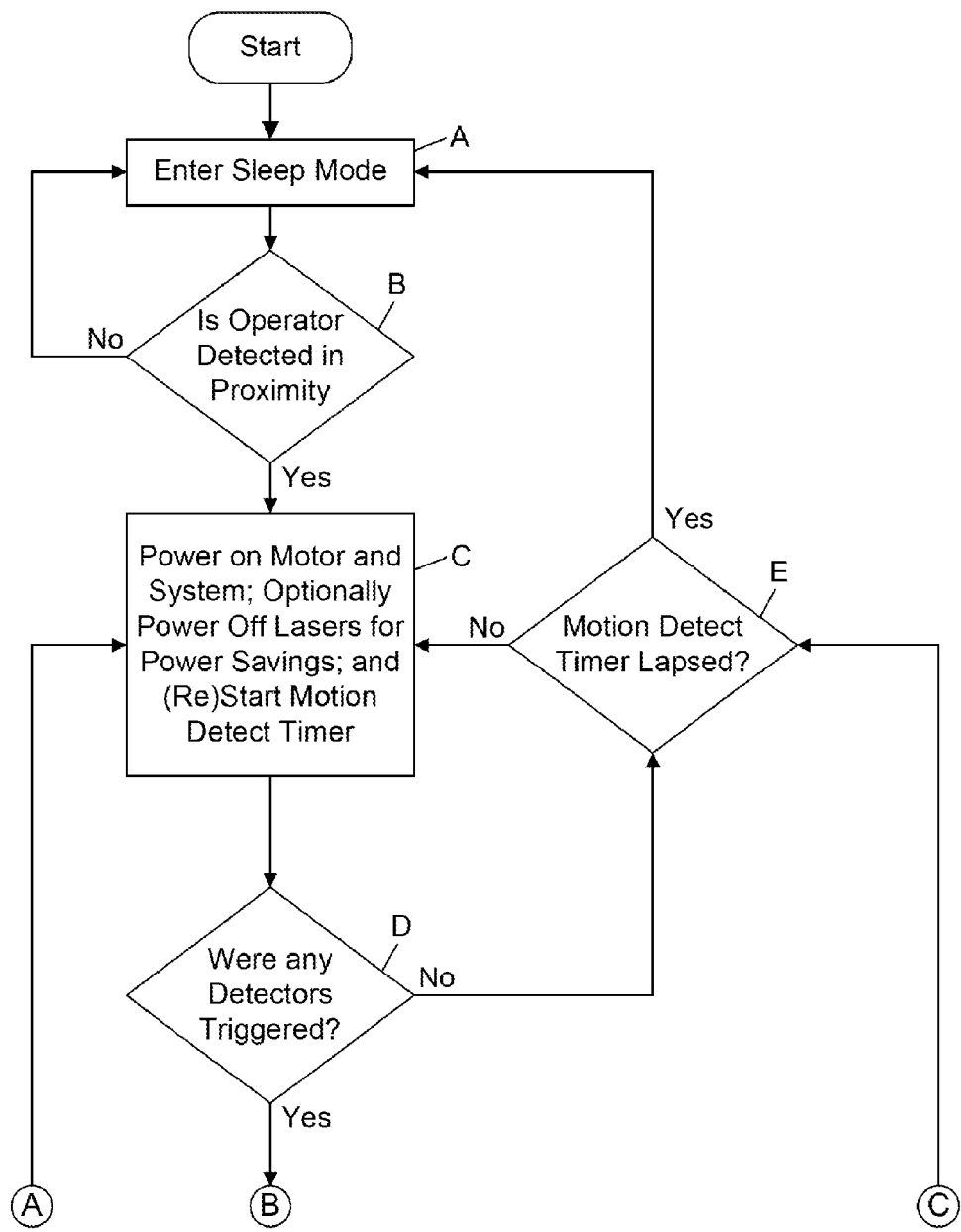
FIGS. 8A and 8B set forth a flow chart describing the control process supported by the system controller within the hybrid scanning/imaging code symbol reading system of the second illustrative embodiment, during its various modes of operation.
Figure 8B:
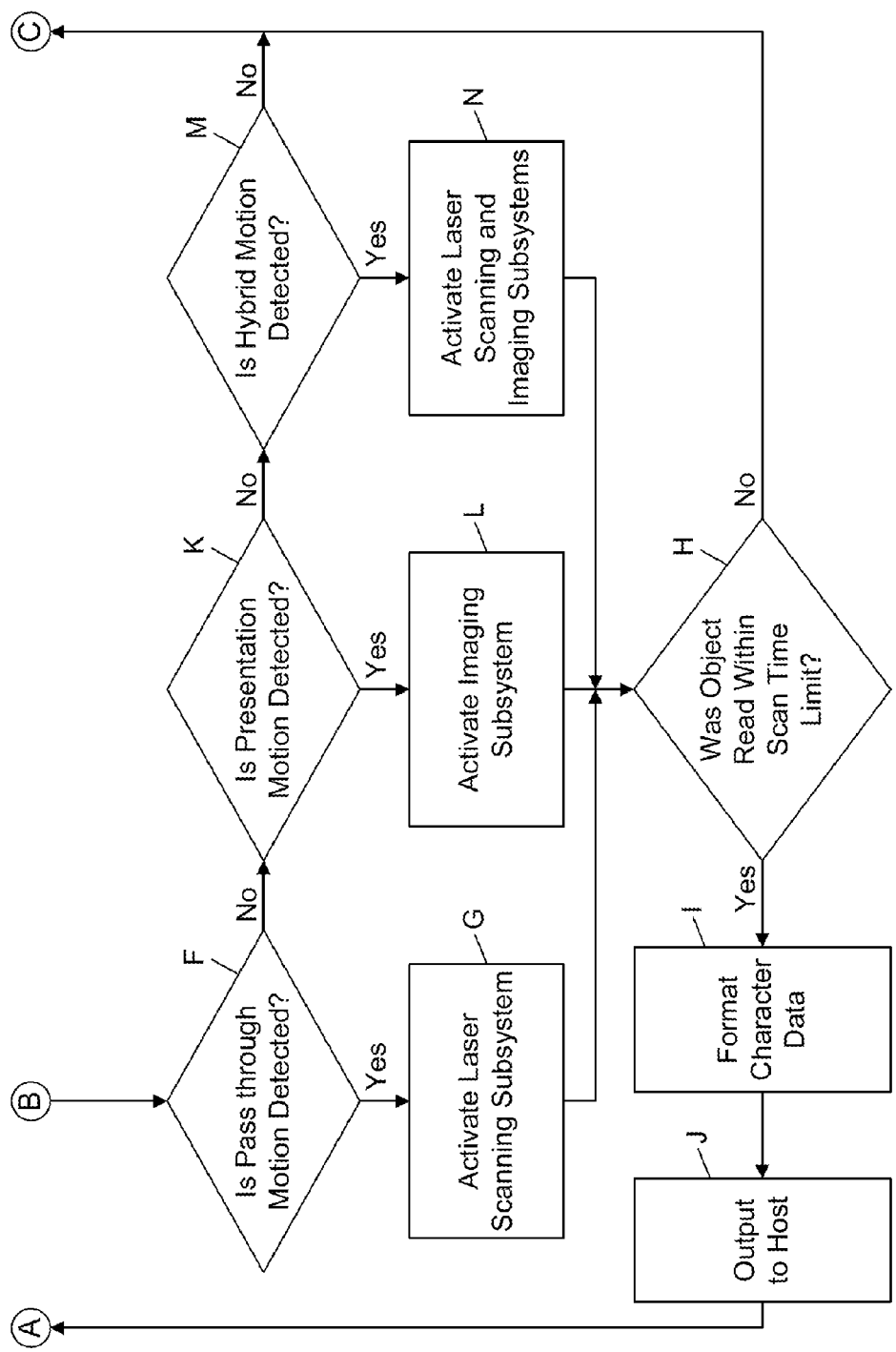

FIGS. 8A and 8B describe the control process supported by the system controller within the bi-optical hybrid scanning/imaging code symbol reading system of the second illustrative embodiment.

At the START Block in FIG. 5A, the system is initialized and programmable/configurable parameters or variables are reset, and at Block A, the system enters its SLEEP mode.

At Block B, the system controller determines whether or not the operator is detected by proximity detector 44D. If not, then the system controller returns to Block A, and if an operator is detected, then the system proceeds to Block C and supplies electrical power to the scanning motor, optionally turns off the electrical power supplied to the laser diodes for power savings purposes, and then (re)starts the Motion Detect Timer.

At Block D, the system controller determines whether or not an object is detected entering the 3D Scanning Volume (i.e. if any edge detectors were triggered). If not, the system controller proceeds to Block E, and determines if the Motion Detect Timer has lapsed? If so, then the system controller returns to Block A and enters the sleep mode. If not, then the system controller returns to Block C.

If an edge detector is triggered at Block D, then the system controller proceeds to Block F and determines if pass-through motion is detected by the object motion detection subsystem. If pass-through motion is detected at Block F, then at Block G the system controller activates the laser scanning subsystem.

At Block H the system controller determines whether or not the object was read within the scan time limit. If not, then the system controller returns to Block E. If so, then the system controller proceeds to Block I where character data is formatted, and at Block J the system controller outputs the data to the host, and then returns to Block C.

If at Block F, pass-through motion is not detected, then at Block K the system controller determines whether or not presentation-type motion is detected. If presentation-type motion is detected at Block K, then at Block L the system controller activates the imaging subsystem.

At Block H the system controller determines whether or not the object was read within the scan time limit. If not, then the system controller returns to Block E. If so, then the system controller proceeds to Block I where character data is formatted, and at Block J the system controller outputs the data to the host, and then returns to Block C.

If at Block K, presentation-through motion is not detected, then at Block M the system controller determines whether or not hybrid-type motion is detected. If hybrid-type motion is detected at Block M, then at Block N the system controller activates both the laser and imaging subsystems.

At Block H the system controller determines whether or not the object was read within the scan time limit. If not, then the system controller returns to Block E. If so, then the system controller proceeds to Block I where character data is formatted, and at Block J the system controller outputs the data to the host, and then returns to Block C.

Modifications that Come to Mind

The above-described control process has been provided as an illustrative example of how the laser scanning subsystem and digital imaging subsystem can be controlled when the hybrid system is operating in its various modes of system operation. Variations and modifications to this control process will readily occur to those skilled in the art having the benefit of the present disclosure. All such modifications and variations are deemed to be within the scope of the accompanying Claims.

The invention claimed is:

1. A symbol reading system, comprising:
an input/output subsystem for transmitting signals to a host computer;
a horizontal housing;
a laser scanning subsystem for reading symbols within a volume above the horizontal housing;
an imaging subsystem for reading symbols within the volume;

a scale for measuring the weight of an object within the volume and transmitting a signal corresponding to the measured weight to the input/output subsystem; and a detection subsystem for projecting a pair of detection beams substantially normal to horizontal housing at the edge of the volume to detect objects in at least one of the detection beams, said detection subsystem comprising at least one photo-receiver positioned within said horizontal housing in alignment with an edge of the volume to receive return light reflected by an object in one of said detection beams and, wherein, in response to the detection of an object, the detection subsystem transmits a signal to the input/output subsystem.

2. The system of claim 1, comprising a proximity detector for detecting the presence of an operator in proximity to the system.

3. The system of claim 1, wherein:
the detection subsystem comprises respective optical devices for projecting the pair of detection beams; and
said respective optical devices are coplanar with a respective photo-receiver.

4. The system of claim 3, wherein said horizontal housing defines coplanar apertures transmitting said detection beams from said optical devices and reflected light to said photo-receiver wherein the detection subsystem detects the direction of movement of objects with respect to the edge of the volume.

5. A symbol reading system, comprising:
an input/output subsystem for transmitting signals to a host computer;
a horizontal housing;
a subsystem for reading symbols within a volume above the horizontal housing;
a scale for measuring the weight of an object within the volume and transmitting a signal corresponding to the measured weight to the input/output subsystem; and
a detection subsystem for projecting a pair of detection beams substantially normal to the horizontal housing at the edge of the volume to detect objects in at least one of the detection beams, said detection subsystem comprising at least one photo-receiver positioned within or on said horizontal housing in alignment with an edge of the volume to receive return light reflected by an object in one of said detection beams, wherein, in response to the detection of an object, said detection subsystem transmits a signal to the input/output subsystem.

6. The system of claim 5, wherein the subsystem for reading symbols comprises a laser scanning subsystem.

7. The system of claim 5, wherein the subsystem for reading symbols comprises an imaging subsystem.

8. The system of claim 5, comprising a proximity detector for detecting the presence of an operator in proximity to the system.

9. The system of claim 5, wherein:
the detection subsystem comprises respective optical devices for projecting the pair of detection beams; and
said respective optical devices are coplanar with a respective photo-receiver.

10. The system of claim 9, wherein said horizontal housing defines coplanar apertures transmitting said detection beams from said optical devices and reflected light to said photo-receiver, wherein the detection subsystem detects the direction of movement of objects with respect to the edge of the volume.

11. A symbol reading system, comprising:
a horizontal housing,
a subsystem for reading symbols within a volume above the horizontal housing;
a scale for measuring the weight of an object within the volume; and
a detection subsystem for projecting a pair of detection beams substantially normal to the horizontal housing at the edge of the volume to detect objects in at least one of the detection beams, said detection subsystem comprising at least one photo-receiver positioned within said horizontal housing in alignment with an edge of the volume to receive return light reflected by an object in one of said detection beams.

12. The system of claim 11, wherein:
the scale generates a signal corresponding to the measured weight; and
the detection subsystem generates a signal in response to the detection of an object.

13. The system of claim 11, wherein the subsystem for reading symbols comprises a laser scanning subsystem.

14. The system of claim 11, wherein the subsystem for reading symbols comprises an imaging subsystem.

15. The system of claim 11, wherein the subsystem for reading symbols comprises a laser scanning subsystem and an imaging subsystem.

16. The system of claim 11, comprising a proximity detector for detecting the presence of an operator in proximity to the system.

17. The system of claim 11, wherein:
the detection subsystem comprises a pair of optical devices for projecting the pair of detection beams; and
the detection beams are IR-based sensing planes.

18. The system of claim 11, wherein the detection subsystem detects the direction of movement of objects with respect to the edge of the volume.

19. The system of claim 11, wherein:
the detection subsystem comprises respective optical devices for projecting the pair of detection beams; and
said respective optical devices are coplanar with a respective photo-receiver.

20. The system of claim 19, wherein said horizontal housing defines coplanar apertures transmitting said detection beams from said optical devices and reflected light to said photo-receiver, wherein the detection subsystem detects the direction of movement of objects with respect to the edge of the volume.

* * * * *